United States Patent
Shah et al.

(10) Patent No.: US 6,489,019 B1
(45) Date of Patent: *Dec. 3, 2002

(54) HIGH SURFACE GLOSS, CO-EXTRUDED SHEETS FROM OLEFIN POLYMER MATERIALS

(75) Inventors: Bakhtiar Alam Shah, Elkton, MD (US); Jay S. Rosenthal, West Chester, PA (US)

(73) Assignee: Basell Poliolefine Italia S.p.A., Milan (IT)

( * ) Notice: Subject to any disclaimer, the term of this patent is extended or adjusted under 35 U.S.C. 154(b) by 0 days.

This patent is subject to a terminal disclaimer.

(21) Appl. No.: 09/454,869

(22) Filed: Dec. 3, 1999

Related U.S. Application Data

(63) Continuation-in-part of application No. 09/315,098, filed on May 19, 1999, now Pat. No. 6,306,518.

(51) Int. Cl.$^7$ .............................. B32B 27/32
(52) U.S. Cl. ................. 428/325; 428/516; 264/173.14; 264/173.15; 264/173.19
(58) Field of Search .................. 428/516, 325; 264/173.14, 173.15, 173.19

(56) References Cited

U.S. PATENT DOCUMENTS

| | | | |
|---|---|---|---|
| 3,437,550 A | 4/1969 | Paul ............................. 161/93 |
| 3,692,602 A | 9/1972 | Okada et al. .................. 156/79 |
| 4,315,050 A | 2/1982 | Rourke ........................ 428/116 |
| 4,734,312 A | 3/1988 | Sugiyama ................... 424/157 |
| 5,011,737 A | 4/1991 | Smith et al. ................. 428/409 |
| 5,030,682 A | 7/1991 | Nomura et al. ............. 524/522 |
| 5,047,446 A | 9/1991 | DeNicola, Jr. .............. 522/157 |
| 5,047,485 A | 9/1991 | DeNicola, Jr. et al. ..... 525/387 |
| 5,140,074 A | 8/1992 | DeNicola, Jr. et al. ..... 525/263 |
| 5,180,628 A | 1/1993 | Haardt et al. ............... 428/215 |
| 5,212,246 A | 5/1993 | Ogale .......................... 525/240 |
| 5,302,454 A | 4/1994 | Cecchin et al. ............. 428/402 |
| 5,409,992 A | 4/1995 | Eppert .......................... 525/88 |
| 5,411,994 A | 5/1995 | Galli et al. ................. 521/50.5 |
| 5,541,236 A * | 7/1996 | De Nicola et al. .......... 522/157 |
| 5,792,560 A * | 8/1998 | Friedman et al. ........... 428/441 |
| 5,856,385 A | 1/1999 | Mehrer et al. .............. 524/108 |
| 6,218,023 B1 * | 4/2001 | De Nicola et al. .......... 428/515 |
| 6,306,518 B1 * | 10/2001 | Shah et al. ................. 428/516 |

FOREIGN PATENT DOCUMENTS

| | | |
|---|---|---|
| DE | 4320636 | 1/1995 |
| DE | 4419162 | 12/1995 |
| EP | 0231013 | 8/1987 |
| EP | 0353496 | 2/1990 |
| EP | 0496111 | 7/1992 |
| EP | 0605235 | 7/1994 |
| EP | 0716121 | 6/1996 |
| EP | 0801102 | 10/1997 |
| EP | 0863183 | 9/1998 |
| EP | 873862 | 10/1998 |
| JP | 58069021 | 4/1983 |
| JP | 63126739 | 5/1988 |
| JP | 5208442 | 8/1993 |
| JP | 6048220 | 2/1994 |
| JP | 6115025 | 4/1994 |
| JP | 6306187 | 11/1994 |
| JP | 7227930 | 8/1995 |
| JP | 8174737 | 7/1996 |
| JP | 8318602 | 12/1996 |
| JP | 9262921 | 10/1997 |
| JP | 10024540 | 1/1998 |
| WO | 9103372 | 3/1991 |
| WO | 9524449 | 9/1995 |
| WO | 9103372 | 1/1998 |
| WO | 9801294 | 1/1998 |
| WO | 9848962 | 11/1998 |

OTHER PUBLICATIONS

"Let's Thermoform Polypropylene" http://www.foamandform.com (©1997–2001).*

Millad® Clarifying Agents (Millad 3988), Milliken Chemical, 1/98.

* cited by examiner

*Primary Examiner*—D. Lawrence Tarazano

(57) ABSTRACT

A co-extruded sheet made from olefin polymer materials includes (1) at least one outer layer of (a) a propylene polymer having a melt flow rate of 0.5–15 dg/min, or a graft copolymer comprising a backbone of a propylene polymer material, to which is graft polymerized a vinyl monomer, and (b) a nucleating agent having a melting point greater than 265° C. and (2) another layer made from (a) about 5% to about 50% of a high melt strength propylene homopolymer or copolymer, and/or about 5% to about 40% of chopped glass fibers, (b). optionally about 5% to about 40% of an inorganic filler, (c) about 2% to about 50% of an olefin polymer composition, and (d) optionally about 5% to about 70% of one or more other olefin polymer materials. When the second layer is reinforced with glass fibers, the stiffness of the sheet is increased while maintaining impact strength. The sheet has high surface gloss and good chemical resistance, and can be thermoformed using a melt phase thermoforming process wherein the surface temperature of the nucleated propylene polymer layer is from at least 310° F.

21 Claims, No Drawings

HIGH SURFACE GLOSS, CO-EXTRUDED SHEETS FROM OLEFIN POLYMER MATERIALS

This application is a continuation-in-part of Ser. No. 09/315,098 filed May 19, 1999 now U.S. Pat. No. 6,306,518.

FIELD OF THE INVENTION

This invention relates to co-extruded sheets made from olefin polymer materials.

BACKGROUND OF THE INVENTION

Structural parts, especially large structural parts, have typically been made from an acrylonitrile/butadiene/styrene rubber (ABS). When weatherability is required, a laminate of ABS and a layer of acrylonitrile/styrene/acrylic resin (ASA) or an acrylic resin is used. These materials have only adequate weatherability, poor chemical resistance, and a high density, which is a disadvantage when used in applications such as, for example, co-extruded profiles; boat hulls and boat decks as well as boat engine covers, consoles, and hatches; indoor and outdoor whirlpool tubs or hot tubs; pick-up truck caps, and body parts for golf carts, all-terrain vehicles, lawn mowers and lawn tractors, and agricultural equipment.

European Patent Application 873,862 discloses co-extruded laminates comprising at least one layer of a graft copolymer made from a propylene polymer material onto which is graft polymerized acrylic and/or styrenic monomers, and at least one other layer comprising one or more polyolefin materials, which may include a high melt strength propylene polymer material. These laminates are characterized by better weather resistance, better chemical resistance, greater toughness, and better scratch and mar resistance than materials available at that time for making large thermoformed structural parts.

Glass fibers have been used to reinforce various polyolefin materials. For example, U.S. Pat. No. 5,030,682 discloses a glass fiber reinforced polyolefin resin composition consisting essentially of (a) 15–80% polypropylene-1, (b) 20–60% polybutene-1, (c) 5–60% glass fiber, (d) 0–5 parts by weight of polyolefin modified with an unsaturated carboxylic acid or unsaturated carboxylic acid derivative per 100 parts of the resin composition, and (e) 0.01–3 parts by weight of a crystal nucleating agent per 100 parts of the resin composition. The composition can be molded to make products having superior surface smoothness, superior heat resistance, and improved mechanical properties.

However, there is still a need for polymer materials having even greater melt strength that will produce thermoformed parts that have an even higher surface gloss after thermoforming than currently available materials. There is also a need for thermoformed parts with significantly increased flexural modulus and good impact strength.

SUMMARY OF THE INVENTION

The co-extruded sheet of the present invention comprises:
(1) at least one outer layer comprising (a) a propylene polymer material selected from the group consisting of (i) a propylene homopolymer or a copolymer of propylene and ethylene or a 4–8 C alpha-olefin, both having a melt flow rate (MFR) of 0.5 to 15 dg/min, wherein the polymerized ethylene or polymerized alpha-olefin content of the copolymer is not greater than 20%, and (ii) a graft copolymer comprising a backbone of a propylene polymer material, having graft polymerized thereto polymerized monomers selected from the group consisting of: at least one acrylic monomer, (II) at least one styrenic monomer, and (III) mixtures of (I) and (II), and (b) about 0.15% to about 0.70% of a nucleating agent having a melting point greater than 265° C. when the propylene polymer material is (i) or about 0.5% to about 1.5% of a nucleating agent having a melting point greater than 265° C. when the propylene polymer material is (ii), and
(2) another layer comprising:
 (a) a material selected from the group consisting of (i) about 5% to about 50% of a propylene polymer having strain hardening elongational viscosity selected from the group consisting of (I) a propylene homopolymer and (II) a copolymer of propylene and ethylene or a 4–10 C alpha-olefin, provided that when the olefin is ethylene, the maximum polymerized ethylene content is 5%, and when the olefin is a 4–10 C alpha-olefin, the maximum polymerized content thereof is 20%, (ii) about 5% to about 40% of chopped glass fibers having a maximum length of ½ inch, and (iii) a mixture of (i) and (ii),
 (b) optionally about 5% to about 40% of an inorganic filler, the total amount of chopped glass fibers plus inorganic filler, when present, being not greater than 50%,
 (c) about 2% to about 50% of an olefin polymer composition comprising
  (i) about 10 parts to about 60 parts by weight of a crystalline propylene homopolymer having an isotactic index greater than 80, or a crystalline copolymer from monomers selected from the group consisting of (a) propylene and ethylene, (b) propylene, ethylene and a $C_4$–$C_8$ α-olefin, and (c) propylene and a $C_4$–$C_8$ α-olefin, the copolymer having a polymerized propylene content of more than 85% by weight and an isotactic index greater than 85;
  (ii) about 5 parts to about 25 parts by weight of a copolymer of ethylene and propylene or a $C_4$–$C_8$ α-olefin that is insoluble in xylene at ambient temperature; and
  (iii) about 30 parts to about 70 parts by weight of an elastomeric copolymer from monomers selected from the group consisting of (a) ethylene and propylene, (b) ethylene, propylene, and a $C_4$–$C_8$ β-olefin, and (c) ethylene and a $C_4$–$C_8$ α-olefin, the copolymer optionally containing about 0.5% to about 10% by weight of a polymerized diene, and containing less than 70% by weight of polymerized ethylene and being soluble in xylene at ambient temperature and having an intrinsic viscosity measured in decahydronaphthalene at 135° C. of about 1.5 to about 4.0 dl/g;
  the total of (ii) and (iii), based on the total olefin polymer composition being from about 50% to about 90%, and the weight ratio of (ii)/(iii) being less than 0.4, wherein the composition is prepared by polymerization in at least two stages and has a flexural modulus of less than 150 MPa; and
 (d) optionally about 5% to about 70% of at least one propylene polymer material selected from the group consisting of:
  (i) a crystalline homopolymer of propylene having an isotactic index greater than 80;

(ii) a crystalline copolymer of propylene and an olefin selected from the group consisting of ethylene and $C_4$–$C_{10}$ α-olefins, provided that when the olefin is ethylene, the maximum polymerized ethylene content is 10% by weight, and when the olefin is a $C_4$–$C_{10}$ α-olefin, the maximum polymerized content thereof is 20% by weight, the copolymer having an isotactic index greater than 85;

(iii) a crystalline terpolymer of propylene and two olefins selected from the group consisting of ethylene and $C_4$–$C_8$ α-olefins, provided that the maximum polymerized $C_4$–$C_8$ α-olefin content is 20% by weight, and, when ethylene is one of the olefins, the maximum polymerized ethylene content is 5% by weight, the terpolymer having an isotactic index greater than 85;

(iv) a thermoplastic olefin comprising:
  (1) about 10% to about 60% of a propylene homopolymer having an isotactic index greater than 80, or a crystalline copolymer from monomers selected from the group consisting of (a) ethylene and propylene, (b) ethylene, propylene, and a $C_4$–$C_8$ α-olefin, and (c) ethylene and a $C_4$–$C_8$ α-olefin, the copolymer having a polymerized propylene content greater than 85% and an isotactic index of greater than 85%;
  (2) about 20% to about 60% of an amorphous copolymer from monomers selected from the group consisting of (a) ethylene and propylene, (b) ethylene, propylene and a $C_4$–$C_8$ α-olefin, and (c) ethylene and a $C_4$–$C_8$ α-olefin, the copolymer optionally containing about 0.5% to about 10% of a polymerized diene, and containing less than 70% polymerized ethylene and being soluble in xylene at ambient temperature; and
  (3) about 3% to about 40% of a copolymer of ethylene and propylene or a $C_4$–$C_8$ α-olefin that is insoluble in xylene at ambient temperature,
wherein the composition has a flexural modulus of greater than 150 but less than 1200 MPa;

(v) a heterophasic polyolefin composition comprising:
  (1) about 30% to about 98% of a polymeric material selected from the group consisting of a propylene homopolymer having an isotactic index greater than 90, and a crystalline copolymer having an isotactic index greater than 85 of propylene and at least one α-olefin of the formula $CH_2=CHR$, where R is H or a $C_2$–$C_6$ alkyl group, the polymerized α-olefin being less than 10% of the copolymer when R is H and being less than 20% when R is a $C_2$–$C_6$ alkyl group or a combination thereof with R=H, and
  (2) about 2% to about 70% of an elastomeric copolymer of propylene and an α-olefin of the formula $CH_2=CHR$, where R is H or a $C_2$–$C_8$ alkyl group, the polymerized α-olefin being about 45% to about 75% of the elastomeric copolymer, and about 10% to about 40% of the elastomeric copolymer being insoluble in xylene at ambient temperature, or an elastomeric copolymer of ethylene and a $C_4$–$C_8$ α-olefin, having a polymerized α-olefin content of about 15% to about 60%, and (vi) a graft copolymer comprising a backbone of a propylene polymer material, having graft polymerized thereto polymerized monomers selected from the group consisting of (I) at least one acrylic monomer, (II) at least one styrenic monomer, and (III) mixtures of (I) and (II),
wherein (a)+(b)+(c)+(d)=100%, and
wherein layer (1) comprises about 5% to about 60% of the total thickness of the sheet.

The process of this invention for making a co-extruded sheet comprises co-extruding a multi-layer sheet comprising:

(1) at least one outer layer comprising (a) a propylene polymer material selected from the group consisting of (i) a propylene homopolymer or a copolymer of propylene and ethylene or a 4–8 C alpha-olefin, both having a melt flow rate of 0.5 to 15 dg/min, wherein the polymerized ethylene or polymerized alpha-olefin content of the copolymer is not greater than 20%, and (ii) a graft copolymer comprising a backbone of a propylene polymer material having graft polymerized thereto polymerized monomers selected from the group consisting of (I) at least one acrylic monomer, (II) at least one styrenic monomer, and (III) mixtures of (I) and (II), and (b) about 0.15% to about 0.70% of a nucleating agent having a melting point greater than 265° C. when the propylene polymer material is (i) or about 0.5% to about 1.5% of a nucleating agent having a melting point greater than 265° C. when the propylene polymer material is (ii), and (2) another layer comprising:
  (a) a material selected from the group consisting of (i) about 5% to about 50% of a propylene polymer having strain hardening elongational viscosity selected from the group consisting of (I) a propylene homopolymer and (II) a copolymer of propylene and ethylene or a 4–10 C alpha-olefin, provided that when the olefin is ethylene, the maximum polymerized ethylene content is 5%, and when the olefin is a 4–10 C alpha-olefin, the maximum polymerized content thereof is 20%, (ii) about 5% to about 40% of chopped glass fibers having a maximum length of ½ inch, and (ii) a mixture of (i) and (ii),
  (b) optionally about 5% to about 40% of an inorganic filler, the total amount of chopped glass fibers and inorganic filler, when present, being not greater than 50%,
  (c) about 2% to about 50% of an olefin polymer composition comprising
    (i) about 10 parts to about 60 parts by weight of a crystalline propylene homopolymer having an isotactic index greater than 80, or a crystalline copolymer from monomers selected from the group consisting of (1) propylene and ethylene, (2) propylene, ethylene and a $C_4$–$C_8$ α-olefin, and (3) propylene and a $C_4$–$C_8$ α-olefin, the copolymer having a polymerized propylene content of more than 85% by weight and an isotactic index greater than 85;
    (ii) about 5 parts to about 25 parts by weight of a copolymer of ethylene and propylene or a $C_4$–$C_8$ α-olefin that is insoluble in xylene at ambient temperature; and
    (iii) about 30 parts to about 70 parts by weight of an elastomeric copolymer from monomers selected from the group consisting of (1) ethylene and propylene, (2) ethylene, propylene, and a $C_4$–$C_8$ α-olefin, and (3) ethylene and a $C_4$–$C_8$ α-olefin, the copolymer optionally containing about 0.5% to about 10% by weight of a polymerized diene, and containing less than 70% by weight of polymerized ethylene and being soluble in xylene at ambient temperature and having an intrinsic viscosity measured in decahydronaphthalene at 135° C. of about 1.5 to about 4.0 dl/g;

the total of (ii) and (iii), based on the total olefin polymer composition being from about 50% to about 90%, and the weight ratio of (ii)/(iii) being less than 0.4, wherein the composition is prepared by polymerization in at least two stages and has a flexural modulus of less than 150 MPa; and (d) optionally about 5% to about 70% of at least one propylene polymer material selected from the group consisting of:
 (i) a crystalline homopolymer of propylene having an isotactic index greater than 80;
 (ii) a crystalline copolymer of propylene and an olefin selected from the group consisting of ethylene and $C_4$–$C_{10}$ α-olefins, provided that when the olefin is ethylene, the maximum polymerized ethylene content is 10% by weight, and when the olefin is a $C_4$–$C_{10}$ α-olefin, the maximum polymerized content thereof is 20% by weight, the copolymer having an isotactic index greater than 85;
 (iii) a crystalline terpolymer of propylene and two olefins selected from the group consisting of ethylene and $C_4$–$C_8$ α-olefins, provided that the maximum polymerized $C_4$–$C_8$ α-olefin content is 20% by weight, and, when ethylene is one of the olefins, the maximum polymerized ethylene content is 5% by weight, the terpolymer having an isotactic index greater than 85;
 (iv) a thermoplastic olefin comprising:
  (1) about 10% to about 60% of a propylene homopolymer having an isotactic index greater than 80, or a crystalline copolymer from monomers selected from the group consisting of (a) ethylene and propylene, (b) ethylene, propylene, and a $C_4$–$C_8$ α-olefin, and (c) ethylene and a $C_4$–$C_8$ α-olefin, the copolymer having a polymerized propylene content greater than 85% and an isotactic index of greater than 85%;
  (2) about 20% to about 60% of an amorphous copolymer from monomers selected from the group consisting of (a) ethylene and propylene, (b) ethylene, propylene and a $C_4$–$C_8$ α-olefin, and (c) ethylene and a $C_4$–$C_8$ α-olefin, the copolymer optionally containing about 0.5% to about 10% of a polymerized diene, and containing less than 70% polymerized ethylene and being soluble in xylene at ambient temperature; and
  (3) about 3% to about 40% of a copolymer of ethylene and propylene or a $C_4$–$C_8$ α-olefin that is insoluble in xylene at ambient temperature,
  wherein the composition has a flexural modulus of greater than 150 but less than 1200 MPa;
 (v) a heterophasic polyolefin composition comprising:
  (1) about 30% to about 98% of a polymeric material selected from the group consisting of a propylene homopolymer having an isotactic index greater than 90, and a crystalline copolymer having an isotactic index greater than 85 of propylene and at least one α-olefin of the formula $CH_2$=CHR, where R is H or a $C_2$–$C_6$ alkyl group, the polymerized α-olefin being less than 10% of the copolymer when R is H and being less than 20% when R is a $C_2$–$C_6$ alkyl group or a combination thereof with R=H, and
  (2) about 2% to about 70% of an elastomeric copolymer of propylene and an α-olefin of the formula $CH_2$=CHR, where R is H or a $C_2$–$C_8$ alkyl group, the polymerized α-olefin being about 45% to about 75% of the elastomeric copolymer, and about 10% to about 40% of the elastomeric copolymer being insoluble in xylene at ambient temperature, or an elastomeric copolymer of ethylene and a $C_4$–$C_8$ α-olefin, having a polymerized α-olefin content of about 15% to about 60%, and
 (vi) a graft copolymer comprising a backbone of a propylene polymer material having graft polymerized thereto polymerized monomers selected from the group consisting of (I) at least one acrylic monomer, (II) at least one styrenic monomer, and (III) mixtures of (I) and (II),
wherein (a)+(b)+(c)+(d)=100%, and
wherein layer (1) comprises about 5% to about 60% of the total thickness of the sheet, at a polymer melt temperature of 230–255° C. as it comes from the extruder die.

The co-extruded sheets of this invention have a highly crystalline hard surface with a high gloss after melt phase thermoforming and good chemical resistance. Large thermoformed structural parts with a deep draw and good part definition can be made from these sheets. A number of different materials can be selected for the optional fourth component of the second layer, making it possible to design a wide variety of materials with whatever combination of properties is desired in the finished product. This combination of properties is not achievable when using a single layer sheet.

When glass fibers are present in layer (2), the co-extruded sheets have a significantly higher flexural modulus than sheets without the glass reinforcement, while maintaining good impact strength.

Composite materials comprising at least one layer of this laminate attached to a low density polyolefin foam layer are another embodiment of this invention.

DETAILED DESCRIPTION OF THE INVENTION

The propylene polymer material (a)(i) that is used in outer layer (1) of the co-extruded sheet of this invention can be a propylene homopolymer or a copolymer of propylene and ethylene or a 4–8 C alpha-olefin, wherein the total amount of polymerized ethylene or polymerized alpha-olefin is not greater than 20%. The homopolymer or copolymer has a melt flow rate of 0.5 to 15 dg/min, preferably about 1.0 to about 4.0 dg/min.

Any propylene homopolymer or copolymer of the specified type having this melt flow rate can be used. However, polymers obtained by visbreaking a polymer having a lower MFR, i.e., subjecting the polymer to chain scission, are preferred. This visbreaking process not only lowers the molecular weight and raises the MFR of the polymers, but it also leads to a narrowing of the molecular weight distribution. Generally speaking, higher molecular weight leads to better physical properties but poorer processing properties. Conversely, lower molecular weight leads to poorer physical properties but better processing properties. A low molecular weight polymer with narrow molecular weight distribution gives both good physical and processing properties in many fabricated articles. Therefore it is a common procedure to polymerize to a higher molecular weight than desired for the final application, and then to visbreak to the desired molecular weight.

In commercial practice visbreaking is generally achieved by the addition of a prodegradant to the polymer before pelletization. Alternatively, the polymer and the prodegradant can be mixed in the extruder while heating. A prodegradant is a substance that promotes chain scission when mixed with the polymer, which is then heated under extrusion conditions. The prodegradants used in current commercial practice are mainly alkyl hydroperoxides or dialkyl peroxides. These materials initiate a free radical chain reaction at elevated temperatures, resulting in scission of the propylene polymer molecules. Alternatively, visbreaking can be accomplished by using shear, or a combination of shear and temperature, without the use of a prodegradant.

The propylene polymer material (a) that is used in outer layer (1) of the co-extruded sheet of this invention can also be a graft copolymer comprising a backbone of a propylene polymer material having graft polymerized thereto monomers selected from the group consisting of: (I) at least one acrylic monomer, (II) at least one styrenic monomer, and (III) mixtures of (I) and (II).

The propylene polymer material that is used as the backbone of the graft copolymer can be:

(1) a homopolymer of propylene having an isotactic index greater than 80, preferably about 85 to about 99;

(2) a copolymer of propylene and an olefin selected from the group consisting of ethylene and 4–10 C alpha-olefins, provided that when the olefin is ethylene, the maximum polymerized ethylene content is about 10%, preferably about 4%, and when the olefin is a 4–10 C alpha-olefin, the maximum polymerized content thereof is about 20% by weight, preferably about 16%, the copolymer having an isotactic index greater than 85;

(3) a terpolymer of propylene and two olefins selected from the group consisting of ethylene and 4–8 C alpha-olefins, provided that the maximum polymerized 4–8 C alpha-olefin content is 20% by weight, preferably about 16%, and, when ethylene is one of the olefins, the maximum polymerized ethylene content is 5% by weight, preferably about 4%, the terpolymer having an isotactic index greater than 85;

(4) an olefin polymer composition comprising:
(a) about 10% to about 60% by weight, preferably about 15% to about 55%, of a propylene homopolymer having an isotactic index greater than 80, preferably about 85 to about 98, or a copolymer of monomers selected from the group consisting of (i) propylene and ethylene, (ii) propylene, ethylene and a 4–8 C alpha-olefin, and (iii) propylene and a 4–8 C alpha-olefin; the copolymer having a polymerized propylene content of more than 85% by weight, preferably about 90% to about 99%, and an isotactic index greater than 85;

(b) about 5% to about 25% by weight, preferably about 5% to about 20%, of a copolymer of ethylene and propylene or a 4–8 C alpha-olefin that is insoluble in xylene at ambient temperature; and (c) about 30% to about 70% by weight, preferably about 40% to about 65%, of an elastomeric copolymer of monomers selected from the group consisting of (i) ethylene and propylene, (ii) ethylene, propylene, and a 4–8 C alpha-olefin, and (iii) ethylene and a 4–8 C alpha-olefin, the copolymer optionally containing about 0.5% to about 10% by weight of a polymerized diene and containing less than 70% by weight, preferably about 10% to about 60%, most preferably about 12% to about 55%, of polymerized ethylene and being soluble in xylene at ambient temperature and having an intrinsic viscosity, measured in decahydronaphthalene at 135° C., of about 1.5 to about 4.0 dl/g, wherein the total amount of (b) and (c), based on the total olefin polymer composition, is about 50% to about 90%, the weight ratio of (b)/(c) is less than 0.4, preferably 0.1 to 0.3, and the composition is prepared by polymerization in at least two stages and has a flexural modulus of less than 150 MPa; or (5) a thermoplastic olefin comprising:
(a) about 10% to about 60%, preferably about 20% to about 50%, of a propylene homopolymer having an isotactic index greater than 80, or a copolymer of monomers selected from the group consisting of (i) ethylene and propylene, (ii) ethylene, propylene and a 4–8 C alpha-olefin, and (iii) ethylene and a 4–8 C alpha-olefin, the copolymer having a polymerized propylene content greater than 85% and an isotactic index of greater than 85;

(b) about 20% to about 60%, preferably about 30% to about 50%, of an amorphous copolymer from monomers selected from the group consisting of (i) ethylene and propylene, (ii) ethylene, propylene, and a 4–8 C alpha-olefin, and (iii) ethylene and a 4–8 C alpha-olefin, the copolymer optionally containing about 0.5% to about 10% of a polymerized diene, and containing less than 70% polymerized ethylene and being soluble in xylene at ambient temperature; and (c) about 3% to about 40%, preferably about 10% to about 20%, of a copolymer of ethylene and propylene or a 4–8 C alpha-olefin that is insoluble in xylene at ambient temperature, wherein the thermoplastic olefin has a flexural modulus of greater than 150 but less than 1200 MPa, preferably about 200 to about 1100 MPa, and most preferably about 200 to about 1000 MPa.

Room or ambient temperature is ~25° C.

The 4–8 C alpha-olefins useful in the preparation of (4) and (5) include, for example, butene-1, pentene-1; hexene-1; 4-methyl-1-pentene, and octene-1.

The diene, when present, is typically a butadiene; 1,4-hexadiene; 1,5-hexadiene, or ethylidenenorbornene.

Propylene polymer materials (4) and (5) can be prepared by polymerization in at least two stages, where in the first stage the propylene; propylene and ethylene; propylene and an alpha-olefin, or propylene, ethylene and an alpha-olefin are polymerized to form component (a) of (4) or (5), and in the following stages the mixtures of ethylene and propylene; ethylene and the alpha-olefin, or ethylene, propylene and the alpha-olefin, and optionally a diene, are polymerized in the presence of (a) to form components (b) and (c) of (4) or (5).

The polymerization can be conducted in liquid phase, gas phase, or liquid-gas phase using separate reactors, all of which can be done either by batch or continuously. For example, it is possible to carry out the polymerization of component (a) using liquid propylene as a diluent, and the polymerization of components (b) and (c) in gas phase, without intermediate stages except for the partial degassing of the propylene. All gas phase is the preferred method.

The preparation of propylene polymer material (4) is described in more detail in U.S. Pat. Nos. 5,212,246 and 5,409,992, which are incorporated herein by reference. The preparation of propylene polymer material (5) is described in more detail in U.S. Pat. Nos. 5,302,454 and 5,409,992, which are incorporated herein by reference.

Propylene homopolymer is the preferred propylene polymer backbone material.

The acrylic monomers that can be graft polymerized onto the propylene polymer material backbone include, for example, acrylic acid; acrylate esters, such as the methyl, ethyl, hydroxyethyl, 2-ethylhexyl, and butyl acrylate esters; methacrylic acid, and methacrylate esters such as the methyl, ethyl, butyl, benzyl, phenylethyl, phenoxyethyl, epoxypropyl, hydroxypropyl methacrylate esters, and mixtures thereof.

The styrenic monomers that can be graft polymerized onto the propylene polymer material backbone include styrene and alkyl or alkoxy ring-substituted styrenes where the alkyl or alkoxy group is a 1–4 C linear or branched alkyl or alkoxy group, and mixtures thereof.

When a mixture of acrylic and styrenic monomers is used, the ratio of acrylic to styrenic monomers can be about 95/5 to about 5/95.

The polymerized monomers comprise about 10 to about 120 parts per hundred parts of the propylene polymer material, preferably about 30 to about 95 pph.

During the graft polymerization, the monomers also polymerize to form a certain amount of free or ungrafted polymer. The morphology of the graft copolymer is such that the propylene polymer material is a continuous or matrix phase, and the polymerized monomer, both grafted and ungrafted, is a dispersed phase.

The graft copolymer can be made according to any one of various methods. One of these methods involves forming active grafting sites on the propylene polymer material by treatment with a peroxide or other chemical compound that is a free radical polymerization initiator, or by irradiation with high energy ionizing radiation. The free radicals produced on the polymer as a result of the chemical or irradiation treatment form the active grafting sites on the polymer and initiate the polymerization of the monomers at these sites. Graft copolymers produced by peroxide-inIitiated grafting methods are preferred.

Preparation of graft copolymers by contacting the polypropylene with a free radical polymerization initiator such as an organic peroxide and a vinyl monomer is described in more detail in U.S. Pat. No. 5,140,074, which is incorporated herein by reference. Preparation of graft copolymers by irradiating an olefin polymer and then treating with a vinyl monomer is described in more detail in U.S. Pat. No. 5,411,994, which is incorporated herein by reference.

When the propylene polymer material in layer (1) is a graft copolymer, the composition can also contain about 2% to about 30%, preferably about 5% to about 30%, based on the total weight of the composition, of one or more rubber components, and/or about 15% to about 50%, preferably about 40% to about 50%, based on the total weight of the composition, of a broad molecular weight distribution propylene polymer material.

The rubber component is selected from one or more of the group consisting of (i) an olefin copolymer rubber, (ii) a monoalkenyl aromatic hydrocarbon-conjugated diene block copolymer, and (iii) a core-shell rubber. Any of these rubber components can have acid or anhydride functionality or can be free of these functional groups. The preferred rubber components are (i) or (ii), either alone or in combination.

Suitable olefin copolymer rubbers include, for example, saturated olefin copolymer rubbers such as ethylene/propylene monomer rubbers (EPM), ethylene/octene-1, and ethylene/butene-1rubbers, and unsaturated olefin copolymer rubbers such as ethylene/propylene/diene monomer rubbers (EPDM). The preferred olefin copolymer rubbers are ethylene/propylene, ethylene/butene-1, and ethylene/octene-1copolymers.

The monoalkenyl aromatic hydrocarbon-conjugated diene block copolymer can be a thermoplastic elastomer of the A-B (or diblock) structure, the linear A-B-A (or triblock) structure, the radial $(A-B)_n$ type where n=3–20%, or a combination of these structure types, wherein each A block is a monoalkenyl aromatic hydrocarbon polymer block, and each B block is an unsaturated rubber block. Various grades of copolymers of this type are commercially available. The grades differ in structure, molecular weight of the mid and end blocks, and the ratio of monoalkenyl aromatic hydrocarbon to rubber. The block copolymer can also be hydrogenated. Typical monoalkenyl aromatic hydrocarbon monomers are styrene, ring-substituted 1–4 C linear or branched alkyl styrenes, and vinyltoluene. Styrene is preferred. Suitable conjugated dienes include, for example, butadiene and isoprene. Preferred block copolymers are hydrogenated styrene/ethylene-butene-1/styrene triblock copolymers.

The weight average molecular weight $(M_w)$ of the block copolymers generally will be in the range of about 45,000 to about 260,000 g/mole, average molecular weights in the range of about 50,000 to about 125,000 g/mole being preferred on the basis that they produce compositions having the best balance of impact strength and stiffness. Also, while block copolymers having unsaturated as well as saturated rubber blocks can be used, copolymers having saturated rubber blocks are preferred, also on the basis of the impact/stiffness balance of the compositions containing them. The weight ratio of monoalkenyl aromatic hydrocarbon to conjugated diene rubber in the block copolymer is in the range of about 5/95 to about 50/50, preferably about 10/90 to about 40/60.

The core-shell rubber components comprise small particles of a crosslinked rubber phase surrounded by a compatibilizing shell, normally a glassy polymer or copolymer. The core is typically a diene rubber such as butadiene or isoprene rubber, or a polyacrylate. The shell is typically a polymer of two or more monomers selected from styrene, methyl methacrylate, and acrylonitrile. Particularly preferred core-shell rubbers have a polyacrylate core.

Suitable impact modifiers include, for example, Engage 8150 or Engage 8200 ethylene/octene-1copolymers commercially available from DuPont-Dow Elastomers; EPM 306P ethylene/propylene copolymer, commercially available from the Polysar Rubber Division of Miles, Incorporated; and Kraton RP6912 styrene/ethylene-propylene/styrene triblock copolymer. rubber and Kraton FG1901X styrene/ethylene-butene-1/styrene triblock copolymer rubber modified with maleic anhydride, commercially available from Shell Chemical Company.

Another optional ingredient is a broad molecular weight distribution propylene polymer material (BMWD PP) having a $M_w/M_n$ of about 5 to about 60, preferably about 5 to about 40; a melt flow rate of about 0.5 to about 50, preferably about 1 to about 30 g/10 min, and xylene insolubles at 25° C. of greater than or equal to 94%, preferably greater than or equal to 96%, and most preferably greater than or equal to 98%. The propylene polymer material having a broad molecular weight distribution can be a homopolymer of propylene or an ethylene/propylene rubber impact-modified homopolymer of propylene, wherein the propylene homopolymer has a broad molecular weight distribution.

The BMWD PP can be prepared by sequential polymerization in at least two stages, in the presence of a Ziegler-Natta catalyst supported on magnesium halide in active form. The polymerization process occurs in separate and consecutive stages, and in each stage polymerization takes place in the presence of the polymer and the catalyst from the preceding stage.

The polymerization process can be carried out in a batch or in a continuous mode according to known techniques, operating in liquid phase in the presence or not of an inert diluent, or in gas phase, or liquid-gas phase, preferably in gas phase. The preparation of the BMWD PP is described in more detail in U.S. Pat. No. 5,286,791, which is incorporated herein by reference.

When the propylene polymer material in layer (1) is a propylene homopolymer or copolymer, the nucleating agent having a melting point of greater than 265° C. is present in an amount of about 0.15% to about 0.70%, preferably about 0.2% to about 0.4%. When the propylene polymer material is a graft copolymer, the nucleating agent having a melting point of greater than 265° C. is present in an amount of about 0.5% to about 1.5%, preferably about 0.7% to about 1.3%. Bis(3,4-dimethylbenzylidene) sorbitol is preferred because of its good temperature resistance during thermoforming, i.e., it has a melting point of 275° C.

The nucleated polypropylene layer (1) is about 5% to about 60% of the total thickness of the laminate.

Layer (2) of the laminate of this invention comprises:
(a) a material selected from the group consisting of (i) about 5% to about 50%, preferably about 15% to about 30%, of a propylene polymer having strain hardening elongational viscosity selected from the group consisting of (i) a propylene homopolymer and (ii) a copolymer of propylene and ethylene or a 4–10 C alpha-olefin, provided that when the olefin is ethylene, the maximum polymerized ethylene content is about 5%, and when the olefin is a 4–10 C alpha-olefin, the maximum polymerized content thereof is 20%, (ii) about 5% to about 40%, preferably about 15% to about 25%, of chopped glass fibers having a maximum length of ½ inch, and (ii) a mixture of (i) and (ii),
(b) optionally about 5% to about 40%, preferably about 10% to about 30%, of an inorganic filler, the total amount of chopped glass fibers plus inorganic filler, when present, being not greater than 50%,
(c) about 2% to about 50%, preferably about 10% to about 30%, of an olefin polymer composition comprising
    (i) about 10 parts to about 60 parts by weight, preferably about 15 parts to about 55 parts, of a crystalline propylene homopolymer having an isotactic index greater than 80, preferably about 85 to about 98, or a crystalline copolymer from monomers selected from the group consisting of (1) propylene and ethylene, (2) propylene, ethylene and a $C_4$–$C_8$ α-olefin, and (3) propylene and a $C_4$–$C_8$ α-olefin, the copolymer having a polymerized propylene content of more than 85% by weight, preferably about 90% to about 99%, and an isotactic index greater than 85;
    (ii) about 5 parts to about 25 parts by weight, preferably about 5 parts to about 20 parts, of a copolymer of ethylene and propylene or a $C_4$–$C_8$ α-olefin that is insoluble in xylene at ambient temperature; and
    (ii) about 30 parts to about 70 parts by weight, preferably about 20 parts to about 65 parts, of an elastomeric copolymer from monomers selected from the group consisting of (1) ethylene and propylene, (2) ethylene, propylene, and a $C_4$–C8 α-olefin, and (3) ethylene and a $C_4$–$C_8$ α-olefin, the copolymer optionally containing about 0.5% to about 10% by weight of a polymerized diene, and containing less than 70% by weight, preferably about 10% to about 60%, most preferably about 12% to about 55%, of polymerized ethylene and being soluble in xylene at ambient temperature and having an intrinsic viscosity measured in decahydronaphthalene at 135° C. of about 1.5 to about 4.0 dl/g;
    the total of (ii) and (iii), based on the total olefin polymer composition being from about 50% to about 90%, and the weight ratio of (ii)/(iii) being less than 0.4, preferably 0.1 to 0.3, wherein the composition is prepared by polymerization in at least two stages and has a flexural modulus of less than 150 MPa; and
(d) optionally about 5% to about 70%, preferably about 30% to about 60%, of at least one propylene polymer material selected from the group consisting of:
    (i) a crystalline homopolymer of propylene having an isotactic index greater than 80;
    (ii) a crystalline copolymer of propylene and an olefin selected from the group consisting of ethylene and $C_4$–$C_{10}$ α-olefins, provided that when the olefin is ethylene, the maximum polymerized ethylene content is 10% by weight, preferably about 4%, and when the olefin is a $C_4$–$C_{10}$ α-olefin, the maximum polymerized content thereof is 20% by weight, preferably about 16%, the copolymer having an isotactic index greater than 85;
    (iii) a crystalline terpolymer of propylene and two olefins selected from the group consisting of ethylene and $C_4$–$C_8$ α-olefins, provided that the maximum polymerized $C_4$–$C_8$ α-olefin content is 20% by weight, preferably about 16%, and, when ethylene is one of the olefins, the maximum polymerized ethylene content is 5% by weight, preferably about 4%, the terpolymer having an isotactic index greater than 85;
    (iv) a thermoplastic olefin comprising:
        (1) about 10% to about 60%, preferably about 20% to about 50%, of a propylene homopolymer having an isotactic index greater than 80, or a crystalline copolymer from monomers selected from the group consisting of (a) ethylene and propylene, (b) ethylene, propylene, and a $C_4$–$C_8$ α-olefin, and (c) ethylene and a $C_4$–$C_8$ α-olefin, the copolymer having a polymerized propylene content greater than 85% and an isotactic index of greater than 85%;
        (2) about 20% to about 60%, preferably about 30% to about 50%, of an amorphous copolymer from monomers selected from the group consisting of (a) ethylene and propylene, (b) ethylene, propylene and a $C_4$–$C_8$ α-olefin, and (c) ethylene and a $C_4$–$C_8$ α-olefin, the copolymer optionally containing about 0.5% to about 10% of a polymerized diene, and containing less than 70% polymerized ethylene and being soluble in xylene at ambient temperature; and (3) about 3% to about 40%, preferably about 10% to about 20%, of a copolymer of ethylene and propylene or a $C_4$–$C_8$ α-olefin that is insoluble in xylene at ambient temperature, wherein the composition has a flexural modulus of greater than 150 but less than 1200 MPa;

(v) a heterophasic polyolefin composition comprising:
(1) about 30% to about 98%, preferably about 60% to about 80%, of a polymeric material selected from the group consisting of a propylene homopolymer having an isotactic index greater than 90, and a crystalline copolymer having an isotactic index greater than 85 of propylene and at least one α-olefin of the formula $CH_2$=CHR, where R is H or a $C_2$–$C_6$ alkyl group, the polymerized α-olefin being less than 10% of the copolymer when R is H and being less than 20% when R is a $C_2$–$C_6$ alkyl group or a combination thereof with R=H, and (2) about 2% to about 70%, preferably about 20% to about 40%, of an elastomeric copolymer of propylene and an α-olefin of the formula $CH_2$=CHR, where R is H or a $C_2$–$C_8$ alkyl group, the polymerized α-olefin being about 45% to about 75%, preferably about 50% to about 70%, of the elastomeric copolymer, and about 10% to about 40% of the elastomeric copolymer being insoluble in xylene at ambient temperature, or an elastomeric copolymer of ethylene and a $C_4$–$C_8$ α-olefin, having a polymerized α-olefin content of about 15% to about 60%, preferably about 15% to about 40%, and (vi) a graft copolymer comprising a backbone of a propylene polymer material, having graft polymerized thereto polymerized monomers selected from the group consisting of: (I) at least one acrylic monomer, (II) at least one styrenic monomer, and (III) mixtures of (I) and (II), wherein (a)+(b)+(c)+(d)=100%, and
wherein layer (1) comprises about 5% to about 60% of the total thickness of the sheet.

The high melt strength propylene polymer (a)(i) in layer (2) is preferably a normally solid, high molecular weight, gel-free, predominantly isotactic, semi-crystalline propylene homopolymer, or a copolymer of propylene and ethylene or a 4–10 C alpha-olefin, provided that when the olefin is ethylene, the maximum polymerized ethylene content is 5%, preferably about 4%, by weight, and when the olefin is a 4–10 C alpha-olefin, the maximum polymerized content thereof is about 20%, preferably about 16%, by weight. The branching index of the propylene homopolymer and copolymer is less than 1, and both have strain hardening elongational viscosity.

The branching index quantifies the degree of long chain branching. In preferred embodiments the branching index of the propylene polymer in (a)(i) of layer (2) is preferably less than about 0.9, and most preferably about 0.3 to 0.5. It is defined by the equation:

$$g' = \frac{[IV]_{Br}}{[IV]_{Lin}}\bigg|_{M_w}$$

in which g' is the branching index, $[IV]_{Br}$ is the intrinsic viscosity of the branched propylene polymer material, and $[IV]_{Lin}$ is the intrinsic viscosity of a normally solid, predominantly isotactic, semi-crystalline, linear propylene polymer material of substantially the same weight average molecular weight, and, in the case of copolymers, substantially the same relative molecular proportion of monomer units.

Intrinsic viscosity, also known as the limiting viscosity number, in its most general sense is a measure of the capacity of a polymer molecule to enhance the viscosity of a solution. This depends on both the size and the shape of the dissolved polymer molecule. In comparing a non-linear polymer with a linear polymer of substantially the same weight average molecular weight, the intrinsic viscosity is an indication of the configuration of the non-linear polymer molecule. The above ratio of intrinsic viscosities is a measure of the degree of branching of the non-linear polymer. A method for determining the intrinsic viscosity of propylene polymer materials is described by Elliott et al., J. App. Poly. Sci., 14, 2947–2963 (1970). The intrinsic viscosity is determined with the polymer dissolved in decahydronaphthalene at 135° C.

Weight average molecular weight can be measured by various procedures. However, the procedure preferably used here is that of low angle laser light scattering photometry, which is disclosed by McConnell in Am. Lab., May 1978, in the article entitled "Polymer Molecular Weights and Molecular Weight Distribution by Low-Angle Laser Light Scattering".

Elongational viscosity is the resistance of a fluid or semi-fluid substance to elongation. It is a melt property of a thermoplastic material that can be determined by an instrument that measures the stress and strain of a specimen in the melt state when subjected to tensile strain at a constant rate. One such instrument is described and shown in FIG. 1 of Munstedt, J. Rheology, 23, (4), 421–425 (1979). A commercial instrument of similar design is the Rheometrics RER-9000 extensional rheometer. Molten, high molecular weight, linear propylene polymer material exhibits elongational viscosity which, as it is elongated or drawn at a constant rate from a relatively fixed point, tends to increase for a distance dependent on the rate of elongation, and then to decrease rapidly until it thins to nothing- so-called ductile or necking failure. On the other hand, the molten propylene polymer material of this invention, that is of substantially the same weight average molecular weight and at substantially the same test temperature as the corresponding molten, high molecular weight, linear, propylene polymer material, exhibits elongational viscosity which, as it is elongated or drawn from a relatively fixed point at substantially the same rate of elongation tends to increase over a longer distance, and to break or fail by fracture- so-called brittle or elastic failure. These characteristics are indicative of strain hardening. The more long chain branching the propylene polymer material of this invention has, the greater the tendency of the elongational viscosity to increase as the elongated material approaches failure. This latter tendency is most evident when the branching index is less than about 0.8.

The high melt strength polymers can be made by treating a normally solid, predominantly crystalline propylene polymer without strain hardening elongational viscosity with a low decomposition temperature peroxide or with high energy ionizing radiation in the substantial absence of atmospheric oxygen, for example, in an environment in which an active oxygen concentration of less than about 15% by volume is maintained. The peroxide-treated or irradiated propylene polymer is then heated or treated with a free radical scavenger in the substantial absence of atmospheric oxygen to deactivate substantially all of the free radicals present in the propylene polymer.

The preparation of the high melt strength propylene polymers having strain hardening elongational viscosity is described in more detail in U.S. Pat. Nos. 5,047,446 and 5,047,485, which are incorporated herein by reference.

Alternatively, the high melt strength propylene polymer used in (a)(i) of layer (2) can be characterized by at least (a) either a $M_z$ of at least $1.0 \times 10^6$ or a $M_z/M_w$ ratio of at least 3.0, and (b) either an equilibrium compliance $J_{eo}$ of at least $12 \times 10^{-5}$ cm²/dyne or a recoverable shear strain per unit stress Sr/S of at least $5 \times 10^{-5}$ cm²/dyne at 1 sec⁻¹.

The molecular weight distribution in a sample of the propylene polymer material can be determined by high temperature gel permeation chromatography (GPC). The Waters 150 CV GPC chromatograph can be used at 135° C. with trichlorobenzene as the carrier solvent and a set of Waters μ-Styragel HT, $10^3$, $10^4$, $10^5$ and $10^6$ columns. The solution concentration is 0.2% (w/v) and the flow rate is 1 ml/min.

The rheological characterization of the propylene polymer materials can be conducted with a programmed Rheometrics Mechanical Spectrometer (RMS-800). Resin pellets are compression molded into sheets from which samples are stamped out with a 25 mm diameter circular die. Tests are conducted at 210±1° C. using 25 m parallel plate geometry with a 1.4mm gap. Creep data are obtained under a constant stress of 1000 dyne/cm² for a period of 0–300 sec. The creep compliance J(t) is given by $$J(t) = \tau(t)/\sigma_o = J_{eo} + t/\eta_o$$

where

τ=strain $\sigma_o$=stress $J_{eo}$=equilibrium compliance $\eta_o$=zero shear viscosity The equilibrium compliance $J_{eo}$ is a measure of melt elasticity and is determined by first plotting strain against time at constant stress. The strain as a function of time is divided by the stress to give J(t). $J_{eo}$ is the intercept of the J(t) against time plot.

The recoverable shear strain per unit stress Sr/S also distinguishes the high melt strength propylene polymer materials. This quantity is a fundamental measure of melt elasticity. Using the programmed Rheometrics Mechanical Spectrometer, the polymer melt is subjected to clockwise rotational shear strain by the driver and the resulting shear stress S and first normal stress $N_1$ are measured by a transducer. The shear rate range is 0.01 to 10 s⁻¹, the time before measurement is 2.2 min and the time of the measurement is 0.3 min. Normal stress measurements are obtained at each shear rate. The recoverable shear strain Sr is obtained from the first normal stress difference $N_1$.

$$Sr = \frac{N_1}{2S}$$

The normalized quantity Sr/S, i.e., recoverable shear strain per unit stress is a measure of melt elasticity.

The chopped glass fibers that are optionally present in layer (2) have a maximum length of ½ inch and can optionally be coated with an aminosilane. The optional glass fibers can be used alone as component (a) in layer (2) or in combination with the propylene polymer material having strain hardening elongational viscosity. When used, the glass fibers are present in an amount of about 5% to about 40%, preferably about 15% to about 25%, based on the total weight of the materials in layer (2).

When glass fibers are present in layer (2), a coupling agent can also be used. The coupling agent can be, for example, polypropylene modified with an α,β-unsaturated carboxylic acid or alicyclic carboxylic acid and derivatives thereof, such as, for example, acrylic acid, methacrylic acid, maleic acid, fumaric acid, itaconic acid, endocyclo(2,2,1)-5-heptene-2,3-carboxylic acid, and cis-4-cyclohexene-1,2-carboxylic acid and anhydrides, esters, amides, and imides thereof. Polypropylenes modified with various amounts of maleic anhydride or maleic acid are preferred and are available commercially, for example, from Eastman Chemical Company and Aristech Chemicals. The modified polypropylenes generally contain about 0.5% to about 10% of maleic acid or maleic anhydride, based on the total weight of the modified polymer. When present, the coupling agent is used in an amount of about 0.5% to about 7%, preferably about 1% to about 5%, based on the total weight of the materials in layer (2).

Optional component (2)(b) is an inorganic filler such as, for example, talc, calcium carbonate, or a silicate. The use of a filler is preferred. Calcium carbonate is the preferred filler. The total amount of chopped glass fibers plus inorganic filler, when present, is not greater than 50%.

The total amount of polymerized ethylene in (2)(c) is preferably about 10% to about 40% by weight.

The $C_{4-8}$ α-olefins useful in the preparation of (2)(c) and (2)(d)(iv) include, for example, butene-1; pentene-1; hexene-1; 4-methyl-1-pentene, and octene-1.

The diene, when present, is typically a butadiene; 1,4-hexadiene; 1,5-hexadiene, or ethylidenenorbornene.

Room or ambient temperature is ~25° C.

Propylene polymer materials (c) and (d)(iv) can be prepared by polymerization in at least two stages, where in the first stage the propylene, or propylene and ethylene or α-olefin, or propylene, ethylene and the α-olefin are polymerized to form component (c)(i) or (d)(iv)(1), and in the following stages the mixtures of ethylene and propylene or the α-olefin, or ethylene, propylene and the α-olefin, and optionally a diene, are polymerized to form components (c)(ii) and (c)(ii) or (d)(iv)(2) and (3).

The polymerization can be conducted in liquid phase, gas phase, or liquid-gas phase using separate reactors, all of which can be done either by batch or continuously. For example, it is possible to carry out the polymerization of component (c)(i) or (d)(iv)(1) using liquid propylene as a diluent, and the polymerization of components (c)(ii) and (iii) and (d)(iv)(2) and (3) in gas phase, without intermediate stages except for the partial degassing of the propylene. An all gas phase process is the preferred method.

The preparation of propylene polymer material (c) is described in more detail in U.S. Pat. Nos. 5,212,246 and 5,409,992, which are incorporated herein by reference. The preparation of propylene polymer material (d)(iv) is described in more detail in U.S. Pat. Nos. 5,302,454 and 5,409,992, which are incorporated herein be reference.

The 2–8 C olefins in (c) include linear and branched alpha-olefins such as, for example, 1-butene; isobutylene; 1-pentene; 1-hexene; 1-octene; 3-methyl-1-butene; 4-methyl-1-pentene; 3,4-dimethyl-1-butene, and 3-methyl-1-hexene.

The heterophasic polyolefin composition (d)(v) can be obtained by sequential polymerization of monomers in the presence of Ziegler-Natta catalyst, or by mechanical blending of components (1) and (2). A suitable sequential polymerization process is described in more detail in U.S. Pat. No. 5,486,419, which is incorporated herein by reference.

The graft copolymer (2)(d)(vi) is the same as the graft copolymer (a)(ii) in layer (1).

Preferably at least one of the propylene polymer materials listed under (d) is present.

Layer (2) is about 40% to about 95% of the total thickness of the laminate.

Additives such as pigments, metallic flake, slip agents, waxes, oils, antiblocking agents, and antioxidants can also be present in the compositions used to form the layers of the co-extruded sheets of this invention.

The process for making the co-extruded sheets of this invention comprises co-extruding a multi-layer sheet comprising:

(1) at least one outer layer comprising (a) a propylene polymer material selected from the group consisting of (i) a propylene homopolymer or a copolymer of propylene and ethylene or a 4–8 C alpha-olefin, both having a melt flow rate of 0.5 to 15 dg/min, wherein the polymerized ethylene or polymerized alpha-olefin content of the copolymer is not greater than 20%, and (ii) a graft copolymer comprising a backbone of a propylene polymer material, having graft polymerized thereto polymerized monomers selected from the group consisting of (I) at least one acrylic monomer, (II) at least one styrenic monomer, and (III) mixtures of (I) and (II), and (b) about 0.15% to about 0.70%, preferably about 0.2% to about 0.4%, of a nucleating agent having a melting point greater than 265° C. when the propylene polymer material is (i) or about 0.5% to about 1.5%, preferably about 0.7% to about 1.3%, of a nucleating agent having a melting point greater than 265° C. when the propylene polymer material is (ii), and (2) another layer comprising:
- (a) a material selected from the group consisting of (i) about 5% to about 50%, preferably about 15% to about 30%, of a propylene polymer having strain hardening elongational viscosity selected from the group consisting of (I) a propylene homopolymer and (II) a copolymer of propylene and ethylene or a 4–10 C alpha-olefin, provided that when the olefin is ethylene, the maximum polymerized ethylene content is about 5%, and when the olefin is a 4–10 C alpha-olefin, the maximum polymerized content thereof is 20%, (ii) about 5% to about 40%, preferably about 15% to about 25%, of chopped glass fibers having a maximum length of ½ inch, and (iii) a mixture of (i) and (ii),
- (b) optionally about 5% to about 40%, preferably about 10% to about 30%, of an inorganic filler, the total amount of chopped glass fibers plus inorganic filler, when present, being not greater than 50%,
- (c) about 2% to about 50%, preferably about 10% to about 30%, of an olefin polymer composition comprising
  - (i) about 10 parts to about 60 parts by weight, preferably about 15 to about 55 parts, of a crystalline propylene homopolymer having an isotactic index greater than 80, preferably about 85 to about 98, or a crystalline copolymer from monomers selected from the group consisting of (1) propylene and ethylene, (2) propylene, ethylene and a $C_4$–$C_8$ α-olefin, and (3) propylene and a $C_4$–$C_8$ α-olefin, the copolymer having a polymerized propylene content of more than 85% by weight, preferably about 90% to about 99%, and an isotactic index greater than 85;
  - (ii) about 5 parts to about 25 parts by weight, preferably about 5 parts to about 20 parts, of a copolymer of ethylene and propylene or a $C_4$–$C_8$ α-olefin that is insoluble in xylene at ambient temperature; and
  - (iii) about 30 parts to about 70 parts by weight, preferably about 20 parts to about 65 parts, of an elastomeric copolymer from monomers selected from the group consisting of (1) ethylene and propylene, (2) ethylene, propylene, and a $C_4$–$C_8$ α-olefin, and (3) ethylene and a $C_4$–$C_8$ α-olefin, the copolymer optionally containing about 0.5% to about 10% by weight of a polymerized diene, and containing less than 70% by weight, preferably about 10% to about 60%, most preferably about 12% to about 55%, of polymerized ethylene and being soluble in xylene at ambient temperature and having an intrinsic viscosity measured in decahydronaphthalene at 135° C. of about 1.5 to about 4.0 dl/g;

the total of (ii) and (iii), based on the total olefin polymer composition being from about 50% to about 90%, and the weight ratio of (ii)/(iii) being less than 0.4, preferably 0.1 to 0.3, wherein the composition is prepared by polymerization in at least two stages and has a flexural modulus of less than 150 MPa; and
- (d) optionally about 5% to about 70%, preferably about 30% to about 60%, of at least one propylene polymer material selected from the group consisting of:
  - (i) a crystalline homopolymer of propylene having an isotactic index greater than 80;
  - (ii) a crystalline copolymer of propylene and an olefin selected from the group consisting of ethylene and $C_4$–$C_{10}$ α-olefins, provided that when the olefin is ethylene, the maximum polymerized ethylene content is 10% by weight, preferably about 4%, and when the olefin is a $C_4$–$C_{10}$ α-olefin, the maximum polymerized content thereof is 20% by weight, preferably about 16%, the copolymer having an isotactic index greater than 85;
  - (iii) a crystalline terpolymer of propylene and two olefins selected from the group consisting of ethylene and $C_4$–$C_8$ α-olefins, provided that the maximum polymerized $C_4$–$C_8$ α-olefin content is 20% by weight, preferably about 16%, and, when ethylene is one of the olefins, the maximum polymerized ethylene content is 5% by weight, preferably about 4%, the terpolymer having an isotactic index greater than 85;
  - (iv) a thermoplastic olefin comprising:
    - (1) about 10% to about 60%, preferably about 20% to about 50%, of a propylene homopolymer having an isotactic index greater than 80, or a crystalline copolymer from monomers selected from the group consisting of (a) ethylene and propylene, (b) ethylene, propylene, and a $C_4$–$C_8$ α-olefin, and (c) ethylene and a $C_4$–$C_8$ α-olefin, the copolymer having a polymerized propylene content greater than 85% and an isotactic index of greater than 85%;
    - (2) about 20% to about 60%, preferably about 30% to about 50%, of an amorphous copolymer from monomers selected from the group consisting of (a) ethylene and propylene, (b) ethylene, propylene and a $C_4$–$C_8$ α-olefin, and (c) ethylene and a $C_4$–$C_8$ α-olefin, the copolymer optionally containing about 0.5% to about 10% of a polymerized diene, and containing less than 70% polymerized ethylene and being soluble in xylene at ambient temperature; and (3) about 3% to about 40%, preferably about 10% to about 20%, of a copolymer of ethylene and propylene or a $C_4$–$C_8$ α-olefin that is insoluble in xylene at ambient temperature, wherein the composition has a flexural modulus of greater than 150 but less than 1200 MPa;

(v) a heterophasic polyolefin composition comprising:

(1) about 30% to about 98%, preferably about 60% to about 80%, of a polymeric material selected from the group consisting of a propylene homopolymer having an isotactic index greater than 90, and a crystalline copolymer having an isotactic index greater than 85 of propylene and at least one α-olefin of the formula $CH_2=CHR$, where R is H or a $C_2$–$C_6$ alkyl group, the polymerized α-olefin being less than 10% of the copolymer when R is H and being less than 20% when R is a $C_2$–$C_6$ alkyl group or a combination thereof with R=H, and (2) about 2% to about 70%, preferably about 20% to about 40%, of an elastomeric copolymer of propylene and an α-olefin of the formula $CH_2=CHR$, where R is H or a $C_2$–$C_8$ alkyl group, the polymerized α-olefin being about 45% to about 75%, preferably about 50% to about 70%, of the elastomeric copolymer, and about 10% to about 40% of the elastomeric copolymer being insoluble in xylene at ambient temperature, or an elastomeric copolymer of ethylene and a $C_4$–$C_8$ α-olefin, having a polymerized α-olefin content of about 15% to about 60%, preferably about 15% to about 40%, and (vi) a graft copolymer comprising a backbone of a propylene polymer material, having graft polymerized thereto polymerized monomers selected from the group consisting of: (I) at least one acrylic monomer (II) at least one styrenic monomer, and (III) mixtures of (I) and (III), wherein (a)+(b)+(c)+(d)=100% and, wherein layer (1) comprises about 5% to about 60% of the total thickness of the sheet, at a polymer melt temperature of 230°–255° C., preferably about 238°–250° C., as it comes from the extruder die.

The combination of extruding at a temperature above the melting point of polypropylene and the use of a nucleating agent having a melting point above 265° C. is required to obtain high surface gloss after melt phase thermoforming.

In addition to a co-extruded sheet comprising the two layers just described, sheets with additional layers on the back of layer (2) can also be made, e.g., another layer having the same composition as layer (1) or a layer made from reground polymer scrap from the manufacture of the co-extruded sheet. When glass fibers are present in layer (2), there is always a third layer present on the back of layer (2).

The co-extruded sheets are typically 100–300 mils thick, although sheets with thicknesses above and below this range can also be made, and are within the broadest ambit of this invention.

The co-extruded sheets of this invention exhibit a combination of (1) good gloss, (2) hardness, (3) good plate impact, (4) good melt phase thermoformability, and (5°)no delamination of layers on impact. In addition, when glass fibers are present in layer (2), the co-extruded sheets have significantly increased flexural modulus, i.e., a minimum increase of 50% compared with a similar polymer matrix without glass reinforcement, while maintaining good impact strength. Typically impact strength decreases when the flexural modulus of a material is increased.

The co-extruded sheets can be used for applications such as co-extruded profiles; boat hulls and boat decks as well as boat engine covers, consoles, hatches, and other boat parts; indoor and outdoor whirlpool tubs or hot tubs; swimming pools; camper tops; household appliance cabinets and door liners; pick-up truck caps; structural and body components for golf carts; sinks; tractor hoods; automobile body panels; outdoor portable toilets; shower stalls; wall panels; counter tops; electrical equipment housings; body panels and engine shrouds for all-terrain vehicles, tractors, and combines; engine covers and body panels for jet skis and snowmobiles, and replacement exterior auto body panels.

A molded part can be made by thermoforming the co-extruded sheets of this invention. The thermoforming process is well known to those skilled in the art and is described, for example, in D. V. Rosato, *Rosato's Plastics Encyclopedia and Dictionary*, Hanser Publishers, 755–757 (1993). The process usually consists of heating a thermoplastic sheet, film, or profile to its softening temperature and forcing the hot and flexible material against the contours of a mold by pneumatic means (differentials in air pressure are created by pulling a vacuum between the plastic and the mold, or the pressure of compressed air is used to force the material against the mold), mechanical means (plug or matched mold, for example), or combinations of pneumatic and mechanical means. The process involves (1) heating the sheet in a separate oven and then transferring the hot sheet to a forming press, (2) using automatic machinery to combine heating and forming in a single unit, or (3) a continuous operation feeding off a roll of thermoplastic material or directly from the exit of an extruder die (post-forming).

In the melt phase process for thermoforming the co-extruded sheets of this invention, the surface temperature of the nucleated propylene polymer material layer (1) is at least 310° F. When the propylene polymer material is a propylene homopolymer or copolymer, the surface temperature is typically is about 310° to about 370° F. When the propylene polymer material is a graft copolymer, the surface temperature is typically about 370° to about 410° F.

The co-extruded sheets have a surface gloss of greater than 80 measured at a reflected light angle of 60°. Thermoformed parts made from the co-extruded sheets can have a surface gloss as high as 87.

Another embodiment of this invention is a composite material comprising (a) at least one layer of the sheet or the thermoformed article of this invention and (b) a layer of a low density polyolefin foam having a density of about 1 to about 15 lb/ft$^3$ and a thickness of about ⅛ inch to about 4 inches, preferably >1 inch up to 3 inches. The low density foam layer can be an extruded foam sheet or plank, or the layer can be molded from foam beads. The low density foam layer can comprise a single thickness of foam, or several thin layers attached to each other, e.g., thermally, such as by the use of a "hot knife", or by the use of a suitable adhesive such as, for example, low molecular weight polyolefins made from functionalized unsaturated monomers with polar groups such as monounsaturated carboxylic acids or their anhydride derivatives such as maleic or itaconic acid or their anhydrides, or unfunctionalized unsaturated monomers; hot melt adhesives, or aqueous- or solvent-based emulsions. Suitable bonding agents include, for example, hydrogenated hydrocarbon resins such as Regalrez tackifiers, commercially available from Hercules Incorporated, and Arkon P tackifiers, commercially available from Arakawa Chemical (U.S.A.) Incorporated; 1023PL amorphous polypropylene tackifying agent available from Eastman Chemical Company, and predominantly amorphous ethylene/propylene copolymers commonly known as ethylene/propylene rubber (EPR).

The foam and the co-extruded sheet can be thermoformed separately and then joined, for example, either thermally or by the use of a suitable adhesive such as those described in the preceding paragraph, or they can be laminated during the forming process.

The polyolefin used to make the foam is preferably the same as the high melt strength propylene polymer having strain hardening elongational viscosity described in (2)(a)

Extruded foam sheets can be made by conventional techniques such as, for example, using a tandem extrusion line. The process consists of mixing the propylene polymer having a high melt strength and high melt elasticity with a nucleating agent in a primary extruder, kneading the mixture, injecting a physical blowing agent into the mixture to form a foaming mixture, transferring the foaming mixture to a secondary extruder, mixing and cooling the foaming mixture, and extruding the foaming mixture through an annular or flat die into a continuous foam sheet. Suitable nucleating agents include a mixture of citric acid and sodium bicarbonate, talc, and titanium dioxide. Suitable blowing agents include hydrocarbons such as butane and isopentane, chlorinated hydrocarbons, chlorofluorocarbons, nitrogen, carbon dioxide, and other inert gases.

Low density foam layers molded from foam beads can be made, for example, by making prefoamed beads by extruding a high melt strength propylene polymer in the presence of a foaming agent such as, for example, pentane, hexane, dichlorotrifluoroethane and methylene chloride. One or more nucleating agents such as talc, colloidal silica, sodium bicarbonate or its blends with citric acid, and azodicarbonamide, can be added to the polymer before or during extrusion. The prefoamed beads are then thermoformed by sintering. A mold having the desired dimensions is filled with the prefoamed beads and the beads are heated by passing a hot pressurized gas such as superheated steam through the mold to obtain sintering and produce the finished article. Such a process is described, for example, in U.S. Pat. No. 5,324,753, which is incorporated herein by reference.

The composite materials can be used for making large structural parts, for example by pressure or melt thermoforming techniques. Examples of parts that can be made from these materials include co-extruded profiles; household appliance cabinets and door liners; hot tubs; and boat hulls and boat decks as well as boat engine covers, consoles, and hatches. The particular combination of materials used is determined by the properties desired in the thermoformed part.

The test methods used to evaluate the properties of the co-extruded sheets were:

| | |
|---|---|
| Flexural modulus (1% secant) | ASTM D-790-86 |
| Tensile strength | ASTM D-638-89 |

-continued

| | |
|---|---|
| Elongation at yield | ASTM D-638-89 |
| Melt flow rate, 230° C., 2.16 kg | ASTM 1238 |
| Rockwell hardness | ASTM D-785A, scale R |
| Heat deflection temperature | ASTM D-648 |
| Total impact energy | ASTM 3763 |

All gloss readings were taken with a 60 degree gloss meter from a smooth (ungrained) sample.

Isotactic index is defined as the percent of olefin polymer insoluble in xylene. The weight percent of olefin polymer soluble in xylene at room temperature is determined by dissolving 2.5 g of the polymer in 250 ml of xylene at room temperature in a vessel equipped with a stirrer, and heating at 135° C. with agitation for 20 minutes. The solution is cooled to 25° C. while continuing the agitation, and then left to stand without agitation for 30 minutes so that the solids can settle. The solids are filtered with filter paper, the remaining solution is evaporated by treating it with a nitrogen stream, and the solid residue is vacuum dried at 80° C. until a constant weight is reached. The percent by weight of polymer insoluble in xylene at room temperature is the isotactic index of the polymer. The value obtained in this manner corresponds substantially to the isotactic index determined via extraction with boiling n-heptane, which by definition constitutes the isotactic index of the polymer.

Intrinsic viscosity is measured in decahydronaphthalene at 135° C.

For the sag resistance test a thermoforming oven is heated to 450° F. A sheet measuring ~8.5" wide and ~18" long is clamped at two ends in a frame. The frame is on rollers and the clamped sheet is rolled into the oven. The sheet is kept in the oven until it sags a distance of 3". The time it takes to sag 3" is recorded and reported as sag resistance.

In this specification, all parts and percentages are by weight unless otherwise noted.

EXAMPLE 1 AND COMPARATIVE EXAMPLE 1

This example shows the physical properties of a co-extruded sheet of this invention. A comparison is also provided between the surface gloss before and after thermoforming of a co-extruded sheet of this invention and a polypropylene sheet that does not contain a nucleating agent.

The composition of the top layer of the sheet in Example 1 is given in Table 1. The samples were compounded on a 40 mm co-rotating, intermeshing twin screw Werner & Pfleiderer ZSK extruder.

TABLE 1

| | Wt. % |
|---|---|
| Visbroken PP | 97.88 |
| LC2OFF antioxidant | 0.2 |
| Pationic 1240 Ca salt | 0.05 |
| Tinuvin 328 antioxidant | 0.29 |
| Tinuvin 770 antioxidant | 0.24 |
| Chimassorb 119 antioxidant | 0.24 |
| Millad 3988 nucleator | 0.25 |
| Ca stearate | 0.1 |
| $TiO_2$ | 0.75 |

The visbroken polypropylene (PP) was obtained by passing a mixture comprising (a) 100 parts of a propylene homopolymer having a MFR of 0.4 dg/min and commercially available from Montell USA Inc., (b) 0.10 pph Irgafos 168 tris (2,4-di-tert-butylphenyl) phosphate antioxidant, (c) 0.10 pph Irganox 1010 tetrakis[methylene-(3,5-di-tert-butyl-4-hydroxyhydrocinnamate)]methane antioxidant, and (d) an amount of Lupersol 101 2,5-dimethyl-2,5(t-butylperoxy) hexane, commercially available from Elf Atochem, sufficient to produce a MFR of 2.5 dg/min (0.067 g/b of resin) through a 3.5" single screw with a mixing head. Both antioxidants are commercially available from Ciba Specialty Chemicals Company.

LC20FF antioxidant is a blend in free-flowing form of 50% Irganox 1010 antioxidant and 50% Irgafos 12 antioxidant, which is 2,2',2"-nitrilo triethyl-tris[3,3',5,5'-tetra-tert-butyl-1,1'-biphenyl-2,2'-diyl] phosphite, commercially available from Ciba Specialty Chemicals Company. Pationic 1240 is a modified calcium salt derived from lactic acid and is commercially available from Patco Polymer Additives Division of American Ingredients Company. Tinuvin 328 2-(2-hydroxy-3,5-ti-tertiaryamylphenyl)-2H-benzotriazole antioxidant; Tinuvin 770 bis(2,2,6,6-tetramethyl-4-piperidinyl) sebacate antioxidant, and Chimassorb 119 antioxidant are all commercially available from Ciba Specialty Chemicals Company. Millad 3988 bis(3,4-dimethylbenzylidene) sorbitol nucleating agent is commercially available from Milliken Chemical Company and has a melting point of 275° C. The additives package was added as a 5% concentrate in a carrier comprising a propylene homopolymer having a MFR of 12 dg/min and a solubility in xylene at room temperature of 4%, commercially available from Montell USA Inc.

The composition used for making the bottom layer of the co-extruded sheet in Example 1 included the following and was compounded on a 92 mm co-rotating, intermeshing twin screw extruder:

(1) 20% high melt strength propylene homopolymer having a MFR of less than 5, made by irradiating a propylene homopolymer having a MFR of 0.8 and a $M_w$ of 800,000 at a dose of 9 Mrads, commercially available from Montell USA Inc., (2) 15% of an olefin polymer composition comprising (a) 33% of a propylene-ethylene random copolymer having an ethylene content of 3.3% and an isotactic index of 94, (b) 8.3% of a semi-crystalline ethylene-propylene copolymer fraction containing ~83% ethylene, and (c) 58.7% of an amorphous ethylene-propylene copolymer fraction containing ~22% ethylene, commercially available from Montell USA, Inc., (3) 38.92% of a heterophasic polyolefin composition comprising 84% propylene homopolymer and 16% of an amorphous ethylene/propylene copolymer, of which 60% is ethylene, commercially available from Montell USA Inc., (4) 25% $CaCO_3$, (5) 0.75% $TiO_2$, (6) 0.22% B225 antioxidant, which is a blend of 1 part Irganox 1010 antioxidant and 1 part Irgafos 168 antioxidant, and (7) 0.11% calcium-stearate.

The composition used for making the sheet in Comparative Example 1 contained the same components as in Example 1, except that the Millad 3988 nucleating agent was omitted and an additional 0.25% of the visbroken polypropylene was added.

The co-extrusion was carried out using a primary extruder having a 6" diameter single screw having a L/D ratio of 38/1 and a barrel temperature of 420° F. (high melt strength propylene polymer layer) and a co-extruder having a 4½" diameter single screw with a L/D ratio of 38/1 and a barrel temperature of 475° F. (top layer). The die was a dual manifold die with a die gap setting of 400 mils. The combined throughput rate was 1400 lb/hr.

The co-extruded sheet was formed on a three station rotary thermoformer using propane gas fired top and bottom heaters. The forming temperature at the high gloss side of the sheet was 330–340° F. as measured with an infrared temperature gun.

The sheet for Comparative Example 1 was extruded on a Killion sheet extruder with a 1½" diameter screw having a 20/1 L/D ratio at a melt temperature of 485° F. and was formed on a single stage electric radiant heated thermoformer (8"×22" sheet) at an oven temperature of 450° F. The sheet surface temperature was >165° C. Our experience has shown that the surface gloss measurements on the nucleated polypropylene sheet are not affected by the presence or absence of a second layer.

The results of the physical property measurements and the surface gloss before and after thermoforming are given in Table 2. Total impact energy is an indication of impact resistance.

TABLE 2

|  | Ex. 1 | Comp. Ex. 1 |
| --- | --- | --- |
| Gloss (60°) (before thermoforming) | 86 | 73 |
| Gloss (60°) (after thermoforming) | 82 | 28 |
| Flexural modulus (MPa) | 1398 | — |
| Tensile strength @ yield (MPa) | 21.89 | — |
| Elongation @ yield (%) | 5.1 | — |
| Heat deflection temperature @ 66 psi (° C.) | 124 | — |
| Total impact energy @ room temperature (joules) | 90.9 | — |
| Density (kg/m$^2$) | 1030 | — |
| Rockwell hardness (R) | 84.8 | — |

The data show that sheets made from nucleated propylene polymer have a higher surface gloss both before and after thermoforming than propylene polymer sheets that do not contain a nucleating agent.

EXAMPLE 2

This example shows the sag resistance, which is an indication of the melt strength, of single sheets made from blends containing various amounts of three polymers: (a) a heterophasic polyolefin composition (HetPO), a high melt strength propylene homopolymer (HMS PP), and (c) an olefin polymer composition (OPC). The three polymer materials were described in Example 1 (bottom layer); There were no pigments or fillers in the compositions, but each sample contained 0.22% B225 antioxidant and 0.11% calcium stearate. The amounts of each polymer are shown in Table 3.

The polymer blends were compounded on a Berstoff 25 mm extruder Single layer sheets 40 mils thick were extruded with a 1½" Killion sheet extruder for testing the sag resistance. The results of the 3" sag test are given in Table 3.

TABLE 3

| Sample | HMS PP | Het PO | OPC | 3" Sag |
| --- | --- | --- | --- | --- |
| 1 | 20 | 50 | 30 | 156 |
| 2 | 20 | 52 | 30 | 154 |

TABLE 3-continued

| Sample | HMS PP | Het PO | OPC | 3" Sag |
|---|---|---|---|---|
| 3 | 20 | 57.5 | 22.5 | 187 |
| 4 | 20 | 65 | 15 | 149 |
| 5 | 35 | 35 | 30 | 175 |
| 6 | 35 | 42.5 | 22.5 | 168 |
| 7 | 35 | 50 | 15 | 167 |
| 8 | 42.5 | 38.75 | 18.75 | 161 |
| 9 | 50 | 20 | 30 | 166 |
| 10 | 50 | 27.5 | 22.5 | 167 |
| 11 | 50 | 35 | 15 | 145 |

The data show that good sag resistance can be obtained with many different blends of the polymer components.

EXAMPLE 3 AND COMPARATIVE EXAMPLES 2 AND 3

This example demonstrates the necessity for using a nucleating agent with a melting point greater than 265° C. in order to obtain high gloss after melt phase thermoforming of the co-extruded sheet of this invention.

A nucleated polypropylene sheet was prepared as described in Example 1. The nucleated polypropylene sheet in Comparative Example 2 was the same as in Example 1 except that the Millad 3988 3,4-dimethylbenzylidene sorbitol (DMBS) was replaced with millad 3905 dibenzylidene sorbitol (DBS), which had a melting point of 220–225° C. The nucleated polypropylene sheet in Comparative Example 3 was the same as in Example 1 except that the Millad 3988 nucleating agent was replaced with Millad 3940 1,3: 2,4-methyldibenzylidene sorbitol (MDBS), which had a melting point of 240–250° C.

The sheets were prepare d by extruding on a 1½" Killion sheet extruder and were formed on a laboratory former as described in Example 1. 60° Gloss measurements were taken at several places on each sheet. Hazy areas developed on the sheets containing DBS and MDBS but not on the sheet that contained DMBS. The range of 60° gloss values recorded from the surface of each sheet is given in Table 4.

TABLE 4

| | Nucleating Agent | Nucleating Agent m.p. (° C.) | 60° Gloss |
|---|---|---|---|
| Example 3 | DMBS | 275 | 80–86 |
| Comp. Example 2 | DBS | 220–225 | 30–75 |
| Comp. Example 3 | MDBS | 240–250 | 30–80 |

The data show that the sheet made with the DMBS nucleating agent exhibited consistently high gloss after thermoforming while the sheets made with a nucleating agent having a melting point below 265° C. did not.

EXAMPLE 4

This example provides a comparison of the surface gloss before and after thermoforming of a co-extruded sheet of this invention in which the propylene polymer material in layer (1) is a graft copolymer comprising a propylene homopolymer backbone to which was grafted a methyl methacrylate/methyl acrylate copolymer (MMA/MeAc).

The composition of the top layer of the sheet is given in Table 5. The samples were compounded on a 40 mm co-rotating, intermeshing twin screw Werner & Pfleiderer ZSK extruder, where the graft copolymer was fed upstream and the remaining components were fed downstream.

TABLE 5

| | Wt. % |
|---|---|
| Graft copolymer | 40.63 |
| BMWD PP | 45.12 |
| Rubber | 10.00 |
| Nucleating agent | 1.00 |
| Pigment | 3.00 |
| LC2OFF antioxidant | 0.20 |
| Pationic 1240 Ca salt | 0.05 |

The propylene polymer used as the backbone polymer had the following properties: spherical form, melt flow rate (MFR) of 9.8 dg/min at 230° C. and 2.16 kg, and 96.1 % insoluble in xylene at room temperature.

The monomers (95.6% MMA and 4.4% MeAc, based on the total weight of monomers) were grafted onto the propylene homopolymer backbone at a grafting temperature of 114° C. using the previously described peroxide-initiated graft polymerization process. Ninety-five parts by weight of monomers were added per 100 parts of polypropylene. Lupersol PMS 50% t-butyl peroxy-2-ethyl hexanoate in mineral spirits, commercially available from Elf Atochem, was used as the peroxide initiator. The monomers were fed at a rate of 1 pph/min for 95 minutes. A monomer to initiator molar ratio of 120 was used. After the addition of monomers the temperature was raised to 140° C. for 60 to 120 minutes under a nitrogen purge until the amount of unreacted MMA in the product was <500 parts per million.

The graft copolymer was blended with a broad molecular weight distribution polypropylene (BMWD PP) having a MFR of 12.0 g/10 min, commercially available from Montell USA Inc.

The rubber was Engage 8200, an ethylene/octene-1 copolymer having a melt index of 5.0 g/10 min (190° C., 2.16 kg), and is commercially available from DuPont-Dow Elastomers.

The pigment was 191067 black color concentrate, commercially available from Ampacet Corporation. The nucleating agent, Irganox LC20FF antioxidant and Pationic 1240 calcium salt were described in Example 1.

The composition used for making the bottom layer of the co-extruded sheet was the same as in Example 1 and was compounded as described in Example 1.

The co-extrusion was carried out using a primary extruder having a 3.5" diameter, two stage single screw having a L/D ratio of 37/1 and a barrel temperature of 460° F. (high melt strength propylene polymer layer) and a co-extruder having a 2.5" diameter, two stage single screw with a L/D ratio of 37/1 and a barrel temperature of 480° F. (top layer). The final two layer construction was nominally 0.250" thick with a top layer thickness of 0.060".

The co-extruded sheet was formed on a single station thermoformer using electric top and bottom heaters. The forming temperature at the high gloss side of the sheet (nucleated graft copolymer layer) was about 400° F. as measured with an infrared temperature gun.

The 60° surface gloss before thermoforming was 88, and after thermoforming it was 75.

EXAMPLE 5

This example describes the preparation of a three layer co-extruded sheet that has glass fibers in the second layer. Total impact energy and flexural modulus of the glass-filled sheet are compared with that of an unfilled sheet. Two samples were prepared that differed in the thickness of each layer.

Layer (A) contained the same components in the same amounts as the top layer in Example 1, except that the amount of visbroken polypropylene was 97.13% and the amount of $TiO^2$ was 1.5%. The composition was compounded on a twin screw extruder at a melt temperature of 235° C. The final melt flow rate (MFR) was 2.6 dg/min.

The components of layer (B) were the same as those of the bottom layer in Example 1, but the following amounts differed:

High melt strength propylene homopolymer—19.82%
Olefin polymer composition—14.88%
Heterophasic polyolefin composition—39.69%
$CaCO_3$—24.54%
$TiO_2$—0.74%

The composition also contained 20 parts by weight of PPG 3793 glass fibers per hundred parts of the polymer composition used for making layer (B). The fibers had a diameter of 10 μm and a length of ⅛ inch and were coated with an aminosilane.

The composition for layer (B) was extruded on a twin screw, 40 mm diameter extruder at a melt temperature of 253° C. The final MFR was 1.7–2.1 dg/min.

Layer (C) had the same composition as layer (A).

The three layer co-extrusion sheet line consisted of extruder A—3.5" diameter, 39:1 length/diameter (L:D) ratio, melt temperature 470° F.; extruder B—6.0" diameter, 36:1 L:D, melt temperature 450° F.; and extruder C—3.5" diameter, 39:1 L:D, melt temperature 450° C.

Melt streams (B) and (C) were delivered into the die by a feed block, while stream (A) was delivered via a dual manifold die to obtain good aesthetics. The three layer sheet was chilled after exiting the die and polished using a three roll up-stack. The roll temperatures were: bottom—190° F.; middle—205° F., and top 210° F.

The total sheet thickness was 0.2 inches. In Sample 1, the layer thickness distribution was A: 0.09", B: 0.02", and C: 0.09". In Sample 2, the layer thickness distribution was A: 0.06"; B: 0.08", and C: 0.06".

The flexural modulus and total impact energy of the two samples are given below.

| Sample | Flexural Modulus (psi) | Total Impact Energy (joules) |
|---|---|---|
| 1 | 210,000 | 87 |
| 2 | 350,000 | 83 |

Co-extruded sheets made from the same materials but without glass fibers in the middle layer had a flexural modulus range of 160,000–180,000 psi and a total impact energy of 80–90 joules.

The co-extruded sheets were thermoformed on a 2.5:1 draw ratio female mold to make high gloss parts under the following conditions:

A sheet surface temperature—320–340° F.
C sheet surface temperature—360–380° F.

The surface gloss (60° angle) before thermoforming was 85% and the gloss after thermoforming was 75–80%.

Other features, advantages and embodiments of the invention disclosed herein will be readily apparent to those exercising ordinary skill after reading the foregoing disclosures. In this regard, while specific embodiments of the invention have been described in considerable detail, variations and modifications of these embodiments can be effected without departing from the spirit and scope of the invention as described and claimed.

We claim:

1. A co-extruded sheet comprising:
   (1) at least one outer layer comprising (a) a propylene polymer material selected from the group consisting of (i) a propylene homopolymer or a copolymer of propylene and ethylene or a 4–8 C alpha-olefin, both having a melt flow rate of 0.5 to 15 dg/min, wherein the polymerized ethylene or polymerized alpha-olefin content of the copolymer is not greater than 20%, and (ii) a graft copolymer comprising a backbone of a propylene polymer material, having graft polymerized thereto polymerized monomers selected from the group consisting of (I) at least one acrylic monomer, (II) at least one styrenic monomer, and (III) mixtures of (I) and (II), and (b) about 0.15% to about 0.70% of a nucleating agent having a melting point greater than 265° C. when the propylene polymer material is (i) or about 0.5% to about 1.5% of a nucleating agent having a melting point greater than 265° C. when the propylene polymer material is (ii), and
   (2) another layer comprising:
      (a) a material selected from the group consisting of (i) about 5% to about 50% of a propylene polymer having strain hardening elongational viscosity selected from the group consisting of (I) a propylene homopolymer, and (II) a copolymer of propylene and ethylene or a 4–10 C alpha-olefin, provided that when the olefin is ethylene, the maximum polymerized ethylene content is about 5%, and when the olefin is a 4–10 C alpha-olefin, the maximum polymerized content thereof is 20%, (ii) about 5% to about 40% of chopped glass fibers having a maximum length of ½ inch, and (iii) a mixture of (i) and (ii),
      (b) optionally about 5% to about 40% of an inorganic filler, the total amount of chopped glass fibers plus inorganic filler, when present, being not greater than 50%,
      (c) about 2% to about 50% of an olefin polymer composition comprising:
         (i) about 10 parts to about 60 parts by weight of a crystalline propylene homopolymer having an isotactic index greater than 80, or a crystalline copolymer from monomers selected from the group consisting of (1) propylene and ethylene, (2) propylene, ethylene and a $C_4$–$C_8$ α-olefin, and (3) propylene and a $C_4$–$C_8$ α-olefin, the copolymer having a polymerized propylene content of more than 85% by weight and an isotactic index greater than 85;
         (ii) about 5 parts to about 25 parts by weight of a copolymer of ethylene and propylene or a $C_4$–$C_8$ α-olefin that is insoluble in xylene at ambient temperature; and
         (iii) about 30 parts to about 70 parts by weight of an elastomeric copolymer from monomers selected from the group consisting of (1) ethylene and propylene, (2) ethylene, propylene, and a $C_4$–$C_8$ α-olefin, and (3) ethylene and a $C_4$–$C_8$ α-olefin, the copolymer optionally containing about 0.5% to about 10% by weight of a polymerized diene, and containing less than 70% by weight of polymerized ethylene and being soluble in xylene at ambient temperature and having an intrinsic viscosity measured in decahydronaphthalene at 135° C. of about 1.5 to about 4.0 dl/g;

the total of (ii) and (iii), based on the total olefin polymer composition being from about 50% to about 90%, and the weight ratio of (ii)/(iii) being less than 0.4, wherein the composition is prepared by polymerization in at least two stages and has a flexural modulus of less than 150 MPa; and (d) optionally about 5% to about 70% of at least one propylene polymer material selected from the group consisting of:
  (i) a crystalline homopolymer of propylene having an isotactic index greater than 80;
  (ii) a crystalline copolymer of propylene and an olefin selected from the group consisting of ethylene and $C_4$–$C_{10}$ α-olefins, provided that when the olefin is ethylene, the maximum polymerized ethylene content is 10% by weight, and when the olefin is a $C_4$–$C_{10}$ α-olefin, the maximum polymerized content thereof is 20% by weight, the copolymer having an isotactic index greater than 85;
  (iii) a crystalline terpolymer of propylene and two olefins selected from: the group consisting of ethylene and $C_4$–$C_8$ α-olefins, provided that the maximum polymerized $C_4$–$C_8$ α-olefin content is 20% by weight, and, when ethylene is one of the olefins, the maximum polymerized ethylene content is 5% by weight, the terpolymer having an isotactic index greater than 85;
  (iv) a thermoplastic olefin comprising:
    (1) about 10% to about 60% of a propylene homopolymer having an isotactic index greater than 80, or a crystalline copolymer from monomers selected from the group consisting of (a) ethylene and propylene, (b) ethylene, propylene, and a $C_4$–$C_8$ α-olefin, and (c) ethylene and a $C_4$–$C_8$ α-olefin, the copolymer having a polymerized propylene content greater than 85% and an isotactic index of greater than 85%;
    (2) about 20% to about 60% of an amorphous copolymer from monomers selected from the group consisting of (a) ethylene and propylene, (b) ethylene, propylene and a $C_4$–$C_8$ α-olefin, and (c) ethylene and a $C_4$–$C_8$ α-olefin, the copolymer optionally containing about 0.5% to about 10% of a polymerized diene, and containing less than 70% polymerized ethylene and being soluble in xylene at ambient temperature; and
    (3) about 3% to about 40% of a copolymer of ethylene and propylene or a $C_4$–$C_8$ α-olefin that is insoluble in xylene at ambient temperature,
    wherein the composition has a flexural modulus of greater than 150 but less than 1200 MPa;
  (v) a heterophasic polyolefin composition comprising:
    (1) about 30% to about 98% of a polymeric material selected from the group consisting of a propylene homopolymer having an isotactic index greater than 90, and a crystalline copolymer having an isotactic index greater than 85 of propylene and at least one α-olefin of the formula $CH_2{=}CHR$, where R is H or a $C_2$–$C_6$ alkyl group, the polymerized α-olefin being less than 10% of the copolymer when R is H and being less than 20% when R is a $C_2$–$C_6$ alkyl group or a combination thereof with R=H, and
    (2) about 2% to about 70% of an elastomeric copolymer of propylene and an α-olefin of the formula $CH_2{=}CHR$, where R is H or a $C_2$–$C_8$ alkyl group, the polymerized α-olefin being about 45% to about 75% of the elastomeric copolymer, and about 10% to about 40% of the elastomeric copolymer being insoluble in xylene at ambient temperature, or an elastomeric copolymer of ethylene and a $C_4$–$C_8$ α-olefin, having a polymerized α-olefin content of about 15% to about 60%, and
  (vi) a graft copolymer comprising a backbone of a propylene polymer material, having graft polymerized thereto polymerized monomers selected from the group consisting of (I) at least one acrylic monomer, (II) at least one styrenic monomer, and (III) mixtures of (I) and (II), wherein (a)+(b)+(c)+(d)=100%, and wherein layer (1) comprises about 5% to about 60% of the total thickness of the sheet.

2. The co-extruded sheet of claim 1 wherein the polymerized monomers in the graft copolymer of layer (1) are a mixture of methyl methacrylate and methyl acrylate.

3. The co-extruded sheet of claim 1 wherein the propylene polymer material that is the backbone polymer of the graft copolymer in layer (1) is selected from the group consisting of:
  (a) a homopolymer of propylene having an isotactic index greater than 80;
  (b) a copolymer of propylene and an olefin selected from the group consisting of ethylene and 4–10 C alpha-olefins, provided that when the olefin is ethylene, the maximum polymerized ethylene content is about 10% and when the olefin is a 4–10 C alpha-olefin, the maximum polymerized content thereof is about 20% by weight, the copolymer having an isotactic index greater than 85;
  (c) a terpolymer of propylene and two olefins selected from the group consisting of ethylene and 4–8 C alpha-olefins, provided that the maximum polymerized 4–8 C alpha-olefin content is 20% by weight, and, when ethylene is one of the olefins, the maximum polymerized ethylene content is 5% by weight, the terpolymer having an isotactic index greater than 85;
  (d) an olefin polymer composition comprising:
    (i) about 10% to about 60% by weight of a propylene homopolymer having an isotactic index greater than 80, or a copolymer of monomers selected from the group consisting of (1) propylene and ethylene, (2) propylene, ethylene and a 4–8 C alpha-olefin, and (3) propylene and a 4–8 C alpha-olefin, the copolymer having a polymerized propylene content of more than 85% by weight and an isotactic index greater than 85;
    (ii) about 5% to about 25% by weight of a copolymer of ethylene and propylene or a 4–8 C alpha-olefin that is insoluble in xylene at ambient temperature; and
    (iii) about 30% to about 70% by weight of an elastomeric copolymer of monomers selected from the group consisting of (I) ethylene and propylene, (2) ethylene, propylene, and a 4–8 C alpha-olefin, and (3) ethylene and a 4–8 C alpha-olefin, the copolymer optionally containing about 0.5% to about 10% by weight of a polymerized diene and containing less than 70% by weight of polymerized ethylene and being soluble in xylene at ambient temperature and having an intrinsic viscosity measured in decahydronaphthalene at 135° C. of about 1.5 to about 4.0 dl/g, wherein the total amount of (ii) and (iii), based on the total olefin polymer composition, is about 50% to about 90%, the weight ratio of (ii)/(iii) is less than 0.4, and the composition is prepared by polymerization in at least two stages and has a flexural modulus of less than 150 MPa; and (e) a thermoplastic olefin comprising:
(i) about 10% to about 60%, of a propylene homopolymer having an isotactic index greater than 80, or a copolymer of monomers selected from the group consisting of (1) ethylene and propylene, (2) ethylene, propylene and a 4–8 C alpha-olefin, and (3) ethylene and a 4–8 C alpha-olefin, the copolymer having a polymerized propylene content greater than 85% and an isotactic index of greater than 85;
(ii) about 20% to about 60% of an amorphous copolymer from monomers selected from the group consisting of (1) ethylene and propylene, (2) ethylene, propylene, and a 4–8 C alpha-olefin, and (3) ethylene and a 4–8 C alpha-olefin, the copolymer optionally containing about 0.5% to about 10% of a polymerized diene, and containing less than 70% polymerized ethylene and being soluble in xylene at ambient temperature; and
(iii) about 3% to about 40% of a copolymer of ethylene and propylene or a 4–8 C alpha-olefin that is insoluble in xylene at ambient temperature,
wherein the thermoplastic olefin has a flexural modulus of greater than 150 but less than 1200 MPa.

4. The co-extruded sheet of claim 3 wherein the propylene polymer material is a propylene homopolymer.

5. The co-extruded sheet of claim 1 wherein the nucleating agent in layer (1) is bis(3,4-dimethylbenzylidene) sorbitol.

6. The co-extruded sheet of claim 1 wherein (2)(a) is a propylene homopolymer.

7. The co-extruded sheet of claim 1 wherein (2)(d) comprises (v), a heterophasic polyolefin composition.

8. The co-extruded sheet of claim 1 wherein (a) in layer (1) is (i) and chopped glass fibers are present in layer (2).

9. A thermoformed article comprising the co-extruded sheet of claim 1.

10. A thermoformed article comprising the co-extruded sheet of claim 4.

11. A thermoformed article comprising the co-extruded sheet of claim 8.

12. A composite material comprising (a) at least one layer of the co-extruded sheet of claim 1, and (b) a polyolefin foam layer having a density of about 1 to about 15 lb/ft$^3$.

13. A composite material comprising (a) at least one layer of the co-extruded sheet of claim 4, and (b) a polyolefin foam layer having a density of about 1 to about 15 lb/ft$^3$.

14. A process for making a co-extruded sheet comprising co-extruding a multi-layer sheet comprising:
(1) at least one outer layer comprising (a) a propylene polymer material selected from the group consisting of
(i) a propylene homopolymer or a copolymer of propylene and ethylene or a 4–8 C alpha-olefin, both having a melt flow rate of 0.5 to 15 dg/min, wherein the polymerized ethylene or polymerized alpha-olefin content of the copolymer is not greater than 20%, and (ii) a graft copolymer comprising a backbone of a propylene polymer material, having graft polymerized thereto polymerized monomers selected from the group consisting of (I) at least one acrylic monomer, (II) at least one styrenic monomer, and (III) mixtures of (I) and (II), and (b) about 0.15% to about 0.70% of a nucleating agent having a melting point greater than 265° C. when the propylene polymer material is (i) or about 0.5% to about 1.5% of a nucleating agent having a melting point greater than 265° C. when the propylene polymer material is (ii), and (2) another layer comprising:
(a) a material selected from the group consisting of (i) about 5% to about 50% of a propylene polymer having strain hardening elongational viscosity selected from the group consisting of (I) a propylene homopolymer and (II) a copolymer of propylene and ethylene or a 4–10 C alpha-olefin, provided that when the olefin is ethylene, the maximum polymerized ethylene content is 5%, and when the olefin is a 4–10 C alpha-olefin, the maximum polymerized content thereof is 20%, (ii) about 5% to about 40% of chopped glass fibers having a maximum length of ½ inch, and (iii) a mixture of (i) and (ii),
(b) optionally about 5% to about 40% of an inorganic filler, the total amount of chopped glass fibers plus inorganic filler, when present, being not greater than 50%,
(c) about 2% to about 50% of an olefin polymer composition comprising
(i) about 10 parts to about 60 parts by weight of a crystalline propylene homopolymer having an isotactic index greater than 80, or a crystalline copolymer from monomers selected from the group consisting of (1) propylene and ethylene, (2) propylene, ethylene and a $C_4$–$C_8$ α-olefin, and (3) propylene and a $C_4$–$C_8$ α-olefin, the copolymer having a polymerized propylene content of more than 85% by weight and an isotactic index greater than 85;
(ii) about 5 parts to about 25 parts by weight of a copolymer of ethylene and propylene or a $C_4$–$C_8$ α-olefin that is insoluble in xylene at ambient temperature; and
(iii) about 30 parts to about 70 parts by weight of an elastomeric copolymer from monomers selected from the group consisting of (1) ethylene and propylene, (2) ethylene, propylene, and a $C_4$–$C_8$ α-olefin, and (3) ethylene and a $C_4$–$C_8$ α-olefin, the copolymer optionally containing about 0.5% to about 10% by weight of a polymerized diene, and containing less than 70% by weight of polymerized ethylene and being soluble in xylene at ambient temperature and having an intrinsic viscosity measured in decahydronaphthalene at 135° C. of about 1.5 to about 4.0 dl/g;
the total of (ii) and (iii), based on the total olefin polymer composition being from about 50% to about 90%, and the weight ratio of (ii)/(iii) being less than 0.4, wherein the composition is prepared by polymerization in at least two stages and has a flexural modulus of less than 150 MPa; and
(d) optionally about 5% to about 70% of at least one propylene polymer material selected from the group consisting of:

(i) a crystalline homopolymer of propylene having an isotactic index greater than 80;

(ii) a crystalline copolymer of propylene and an olefin selected from the group consisting of ethylene and $C_4$–$C_{10}$ α-olefins, provided that when the olefin is ethylene, the maximum polymerized ethylene content is 10% by weight, and when the olefin is a $C_4$–$C_{10}$ α-olefin, the maximum polymerized content thereof is 20% by weight, the copolymer having an isotactic index greater than 85;

(iii) a crystalline terpolymer of propylene and two olefins selected from the group consisting of ethylene and $C_4$–$C_8$ α-olefins, provided that the maximum polymerized $C_4$–$C_8$ α-olefin content is 20% by weight, and, when ethylene is one of the olefins, the maximum polymerized ethylene content is 5% by weight, the terpolymer having an isotactic index greater than 85;

(iv) a thermoplastic olefin comprising:
  (1) about 10% to about 60% of a propylene homopolymer having an isotactic index greater than 80, or a crystalline copolymer from monomers selected from the group consisting of (a) ethylene and propylene, (b) ethylene, propylene, and a $C_4$–$C_8$ α-olefin, and (c) ethylene and a $C_4$–$C_8$ α-olefin, the copolymer having a polymerized propylene content greater than 85% and an isotactic index of greater than 85%;
  (2) about 20% to about 60% of an amorphous copolymer from monomers selected from the group consisting of (a) ethylene and propylene, (b) ethylene, propylene and a $C_4$–$C_8$ α-olefin, and (c) ethylene and a $C_4$–$C_8$ α-olefin, the copolymer optionally containing about 0.5% to about 10% of a polymerized diene, and containing less than 70% polymerized ethylene and being soluble in xylene at ambient temperature; and
  (3) about 3% to about 40% of a copolymer of ethylene and propylene or a $C_4$–$C_8$ α-olefin that is insoluble in xylene at ambient temperature,
  wherein the composition has a flexural modulus of greater than 150 but less than 1200 MPa;

(v) a heterophasic polyolefin composition comprising:
  (1) about 30% to about 98% of a polymeric material selected from the group consisting of a propylene homopolymer having an isotactic index greater than 90, and a crystalline copolymer having an isotactic index greater than 85 of propylene and at least one α-olefin of the formula $CH_2=CHR$, where R is H or a $C_2$–$C_6$ alkyl group, the polymerized α-olefin being less than 10% of the copolymer when R is H and being less than 20% when R is a $C_2$–$C_6$ alkyl group or a combination thereof with R=H, and
  (2) about 2% to about 70% of an elastomeric copolymer of propylene and an α-olefin of the formula $CH_2=CHR$, where R is H or a $C_2$–$C_8$ alkyl group, the polymerized α-olefin being about 45% to about 75% of the elastomeric copolymer, and about 10% to about 40% of the elastomeric copolymer being insoluble in xylene at ambient temperature, or an elastomeric copolymer of ethylene and a $C_4$–$C_8$ α-olefin, having a polymerized α-olefin content of about 15% to about 60%, and (vi) a graft copolymer comprising a backbone of a propylene polymer material, having graft polymerized thereto polymerized monomers selected from the group consisting of: (I) at least one acrylic monomer, (II) at least one styrenic monomer, and (III) mixtures of (I) and (II), wherein (a)+(b)+(c)+(d)=100%, and wherein layer (1) comprises about 5% to about 60% of the total thickness of the sheet, at a polymer melt temperature of 230–255° C. as it comes from the extruder die.

15. The process of claim 14 wherein the polymerized monomers in the graft copolymer of layer (1) are a mixture of methyl methacrylate and methyl acrylate.

16. The process of claim 14 wherein the propylene polymer material that is the backbone polymer of the graft copolymer in layer (1) is selected from the group consisting of:
  (a) a homopolymer of propylene having an isotactic index greater than 80;
  (b) a copolymer of propylene and an olefin selected from the group consisting of ethylene and 4–10 C alpha-olefins, provided that when the olefin is ethylene, the maximum polymerized ethylene content is about 10% and when the olefin is a 4–10 C alpha-olefin, the maximum polymerized content thereof is about 20% by weight, the copolymer having an isotactic index greater than 85;
  (c) a terpolymer of propylene and two olefins selected from the group consisting of ethylene and 4–8 C alpha-olefins, provided that the maximum polymerized 4–8 C alpha-olefin content is 20% by weight, and, when ethylene is one of the olefins, the maximum polymerized ethylene content is 5% by weight, the terpolymer having an isotactic index greater than 85;
  (d) an olefin polymer composition comprising:
    (i) about 10% to about 60% by weight of a propylene homopolymer having an isotactic index greater than 80, or a copolymer of monomers selected from the group consisting of (1) propylene and ethylene, (2) propylene, ethylene and a 4–8 C alpha-olefin, and (3) propylene and a 4–8 C alpha-olefin, the copolymer having a polymerized propylene content of more than 85% by weight and an isotactic index greater than 85;
    (ii) about 5% to about 25% by weight of a copolymer of ethylene and propylene or a 4–8 C alpha-olefin that is insoluble in xylene at ambient temperature; and
    (iii) about 30% to about 70% by weight of an elastomeric copolymer of monomers selected from the group consisting of (1) ethylene and propylene, (2) ethylene, propylene, and a 4–8 C alpha-olefin, and (3) ethylene and a 4–8 C alpha-olefin, the copolymer optionally containing about 0.5% to about 10% by weight of a polymerized diene and containing less than 70% by weight of polymerized ethylene and being soluble in xylene at ambient temperature and having an intrinsic viscosity measured in decahydronaphthalene at 135° C. of about 1.5 to about 4.0 dl/g,
    wherein the total amount of (ii) and (iii), based on the total olefin polymer composition, is about 50% to about 90%, the weight ratio of (ii)/(iii) is less than 0.4, and the composition is prepared by polymerization in at least two stages and has a flexural modulus of less than 150 MPa; and (e) a thermoplastic olefin comprising:
(i) about 10% to about 60%, of a propylene homopolymer having an isotactic index greater than 80, or a copolymer of monomers selected from the group consisting of (1) ethylene and propylene, (2) ethylene, propylene and a 4–8 C alpha-olefin, and (3) ethylene and a 4–8 C alpha-olefin, the copolymer having a polymerized propylene content greater than 85% and an isotactic index of greater than 85;
(ii) about 20% to about 60% of an amorphous copolymer from monomers selected from the group consisting of (1) ethylene and propylene, (2) ethylene, propylene, and a 4–8 C alpha-olefin, and (3) ethylene and a 4–8 C alpha-olefin, the copolymer optionally containing about 0.5% to about 10% of a polymerized diene, and containing less than 70% polymerized ethylene and being soluble in xylene at ambient temperature; and
(iii) about 3% to about 40% of a copolymer of ethylene and propylene or a 4–8 C alpha-olefin that is insoluble in xylene at ambient temperature,
wherein the thermoplastic olefin has a flexural modulus of greater than 150 but less than 1200 MPa.

17. The process of claim 16 wherein the propylene polymer material is a propylene homopolymer.

18. The process of claim 14 wherein the nucleating agent in layer (1) is bis(3,4-dimethylbenzylidene) sorbitol.

19. The process of claim 14 wherein (2)(a) is a propylene homopolymer.

20. The process of claim 14 wherein (2)(d) comprises (v), a heterophasic polyolefin composition.

21. The process of claim 14 wherein (a) in layer (1) is (i) and chopped glass fibers are present in layer (2).

* * * * *